(12) United States Patent
Strohm et al.

(10) Patent No.: US 11,433,325 B2
(45) Date of Patent: Sep. 6, 2022

(54) FILTER ELEMENT AND FILTER MODULE COMPRISING SAME

(71) Applicant: PALL CORPORATION, Port Washington, NY (US)

(72) Inventors: Gerhard Strohm, Dexheim (DE); Georg Schnieder, Bad Kreuznach (DE); Ralph Heusslein, Steinbach (DE)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 16/560,364

(22) Filed: Sep. 4, 2019

(65) Prior Publication Data
US 2020/0078712 A1    Mar. 12, 2020

(30) Foreign Application Priority Data
Sep. 6, 2018  (EP) ..................... 18193047

(51) Int. Cl.
*B01D 29/46* (2006.01)
*B01D 29/48* (2006.01)
*B01D 39/16* (2006.01)

(52) U.S. Cl.
CPC ............ *B01D 29/46* (2013.01); *B01D 29/48* (2013.01); *B01D 39/1607* (2013.01); *B01D 2201/182* (2013.01); *B01D 2239/04* (2013.01)

(58) Field of Classification Search
CPC .... B01D 29/46; B01D 29/48; B01D 39/1607; B01D 2239/04; B01D 2201/182;
(Continued)

(56) References Cited

U.S. PATENT DOCUMENTS

| 4,676,904 A | 6/1987 | Schröder |
| 5,736,044 A | 4/1998 | Proulx et al. |

(Continued)

FOREIGN PATENT DOCUMENTS

| DE | 8713306 U1 | 11/1987 |
| EP | 3093054 A1 * | 11/2016 | ............ C12M 33/14 |

(Continued)

OTHER PUBLICATIONS

European Patent Office, Extended European Search Report in counterpart European Application No. 18193047.0, dated Mar. 19, 2019.

*Primary Examiner* — Madeline Gonzalez
(74) *Attorney, Agent, or Firm* — Leydig, Voit & Mayer, Ltd.

(57) ABSTRACT

The invention relates to a filter element comprising one or more fluid-pervious layers of a fluid-pervious sheet material having first and second surfaces in a substantially parallel arrangement, a fluid-impervious layer arranged in fluid tight contact with at least one of said first and second surfaces of said layer(s) of fluid-pervious sheet material to substantially fully cover the first and/or second surfaces thereof, one or more first and second edge portions, said first and second edge portions being arranged at a predefined distance and separated from one another by a predefined area of the fluid-pervious sheet material, a fluid flow path limited to and extending essentially parallel to the first and second surfaces from the first edge portion(s) to the second edge portion(s) within each of said layers of fluid-pervious sheet material, said first and second edge portions providing a fluid intake and a fluid drainage at the upstream and downstream ends of said fluid flow path, respectively. The invention further relates to filter modules comprising one or more of said filter elements.

26 Claims, 15 Drawing Sheets

(58) Field of Classification Search
CPC .... B01D 29/237; B01D 29/216; B01D 63/10;
B01D 71/26; B01D 67/0002; B01D
69/02; B01D 61/00; B01D 2325/24;
B01D 27/14; B01D 27/144; B01D
29/0047; B01D 29/0054
USPC ........ 210/435, 490, 488, 253, 491, 505, 508
See application file for complete search history.

(56) References Cited

U.S. PATENT DOCUMENTS

| | | |
|---|---|---|
| 8,464,877 B2 | 6/2013 | Diemer et al. |
| 2002/0046971 A1 | 4/2002 | Strohm et al. |

FOREIGN PATENT DOCUMENTS

| | | | |
|---|---|---|---|
| EP | 3093054 A1 | 11/2016 | |
| GB | 532585 A | 1/1941 | |
| WO | WO 1998/035740 A1 | 8/1998 | |
| WO | WO 2003/041829 A2 | 5/2003 | |
| WO | WO 2008/098689 A1 | 8/2008 | |

* cited by examiner

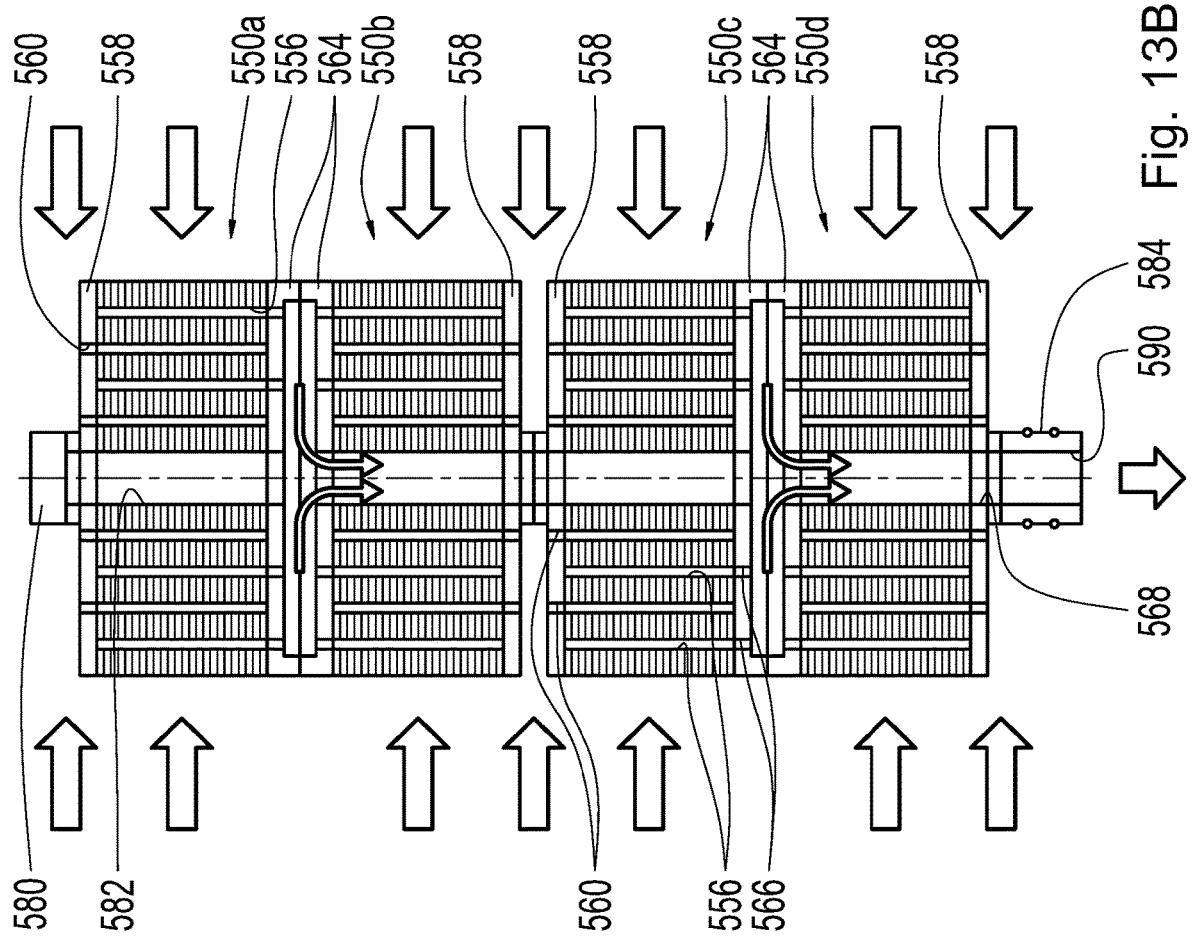
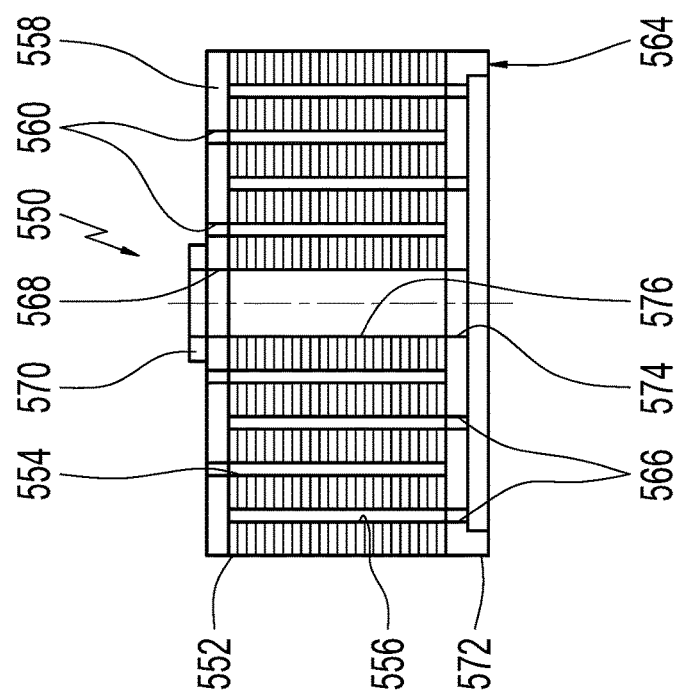
Fig. 13B
Fig. 13A

FILTER ELEMENT AND FILTER MODULE COMPRISING SAME

CROSS-REFERENCE TO RELATED APPLICATIONS

This patent application claims the benefit under 35 USC 119(b) of European Patent Application No. 18193047.0, filed Sep. 6, 2018, which is incorporated by reference.

BACKGROUND OF THE INVENTION

The present invention relates to a filter element and a filter module comprising one or more of such filter elements. The invention further relates to a method for making the inventive filter elements.

Filter elements comprising porous depth filter material are abundantly known. The depth filter material is provided in many cases in the form of a sheet material. The fluid to be filtered is directed to an upstream surface of the sheet material whereas a filtrate is drained from the opposite or downstream surface of the sheet material. The edges of the sheet material are typically compressed or otherwise sealed in order to pass the fluid to be filtered in an essentially perpendicular direction to the surfaces through the sheet material and prevent leakage of fluid at the edges thereof.

More recently, filter elements using the depth filter material in a so-called edge-flow arrangement are known from WO 98/35740 A1 where the fluid to be filtered is directed to first edge surfaces of stacked circular sheets of depth filter material and the fluid flow occurs within the depth filter material essentially in parallel to the surfaces of the individual sheets. The filtrate exits the depth filter material at second edge surfaces spaced apart from the first edge surfaces.

Furthermore, as an alternative to the use of stacked circular sheet material, U.S. Pat. No. 8,464,877 B2 to Diemer et al. proposes an edge-flow arrangement where a sheet material is wound to form a spiral roll. The sheet material is provided with multiple openings the boundary surfaces of which serve as flow-through surfaces. The openings of the sheet material in subsequent layers of the spiral roll are positioned on top of one another, thus forming a plurality of radially extending channels, one group of channels serving as inlet channels and another group of channels serving as outlet channels.

While filter elements of this type are useful in various applications, especially in the field of food and beverage, with respect to filtration applications, e.g., in the field of biotechnology and pharmaceuticals, especially where high bacterial removal efficiencies are of importance, such type filter elements did not satisfy all requirements.

The object of the present invention is to provide a filter element, especially for applications where high bacterial removal efficiency is required.

SUMMARY OF THE INVENTION

The above object is solved by a filter element according to claim 1. The fluids to be treated are typically liquids but may also be gaseous.

According to the basic concept of the present invention, the filter element comprises one or more layers of a fluid-pervious sheet material having first and second surfaces in a substantially parallel arrangement. A fluid-impervious layer is arranged in fluid tight contact to at least one of said first and second surfaces of said layer of fluid-pervious sheet material to substantially fully cover the first and/or second surfaces thereof. The filter element further comprises one or more first and second edge portions, said first and second edge portions being arranged at a predefined distance and separated from one another by a predefined area of the fluid-pervious sheet material. Thereby a defined fluid flow path limited to and extending essentially parallel to the first and second surfaces of each of said layers of fluid-pervious sheet material from the first edge portion(s) to the second edge portion(s) is provided. Said first and second edge portion(s) of the layer(s) provide a fluid intake and a fluid drainage at the upstream and downstream ends of said fluid flow path, respectively. The fluid-pervious sheet material is typically designed as a depth filter material.

Surprisingly, the filter element of the present invention is especially suitable for applications where liquids are treated and high bacterial removal rates are to be obtained. Furthermore, the inventive filter element allows to restrict the fluid flow path to extend solely within the volume provided by the individual layer(s) of fluid-pervious sheet material, thus providing an improved removal efficiency, especially also in cases where a predefined removal rate of bacterial contaminants has to be guaranteed.

In a simple embodiment the filter element may have only one first or one second edge portion. The number of the corresponding second and first edge portions, respectively, may vary. In one embodiment there may be only one first and one second edge portion and the edge portions may be arranged concentrically and the filter element may be in the form of a hollow cylinder.

In case a single layer of a fluid-pervious sheet material is used in an inventive filter element both surfaces of the sheet material are provided with fluid-impervious layers.

In case of filter elements according to the present invention where multiple layers of the fluid-pervious sheet material are stacked on top of one another or are wound to a spiral roll, a single layer of fluid-impervious material may be used to cover the first surface of a first layer of fluid-pervious sheet material and the second surface of an adjacent layer of fluid-pervious sheet material.

Thus, the stack or spiral roll can be assembled in different ways.

According to a first embodiment the multiple layers of fluid-pervious sheet material are provided with the fluid-impervious layer only on one surface thereof and only an end surface (top or bottom) of the stack or (inner or outer surface) of the spiral roll of fluid-pervious sheet material is provided with a further fluid-impervious layer.

In another embodiment the layers of fluid-pervious sheet material of the stack may alternatingly be provided with a fluid-impervious layer on both surfaces and with no fluid-impervious layers, provided that both on top and on the bottom (end surfaces) of the stack is completed with a further fluid-impervious layer.

In addition, it is noted that the fluid-impervious layers need not to be applied in a fluid tight manner onto the surfaces of the individual layers before assembling the same to a stack. Thus, according to one embodiment an alternating assembly of fluid-impervious layers and fluid-pervious layers may be provided in the form of a stack, whereas the fluid tight contact of the fluid-impervious layers to the surfaces of the fluid-pervious layers is only subsequently established once the stack has been assembled.

Advantageously, according to the present invention, the fluid-pervious sheet material may be selected from a broad variety of fluid-pervious materials and need not be resilient in order to provide a sealing contact of adjacent layers or stacked filter elements, since the fluid tight contact is provided by the use of the fluid-impervious layer(s).

Furthermore, the present invention does not require flat surfaces of the fluid-pervious sheet material but one or both of the surfaces may have an irregular structure. Due to the application of a fluid-impervious layer on one or both surfaces of the fluid-pervious sheet material in fluid tight contact, reliable results upon filtration are nevertheless provided.

The present invention further relates to a filter module comprising one or more filter elements.

Said filter module has a fluid inlet arranged in fluid communication with the fluid intake of the filter element(s) and a fluid outlet in fluid communication with the drainage of the filter element(s).

The filter modules may be incorporated into a filter system.

A still further aspect of the present invention resides in a method for preparing the inventive filter elements.

DETAILED DESCRIPTION OF THE INVENTION

In accordance with the present invention, the fluid-pervious sheet material may be made of a fibrous depth filter material. Alternatively, fluid-pervious sheet material made of sintered particles, especially ceramic particles, may be used. Furthermore, open-porous membranes may be used as fluid-pervious sheet material.

Typical examples of fibrous depth filter materials useful in the present invention are described in the U.S. Pat. No. 4,676,904 A to Schröder and in the German utility model registration DE 87 13 306 U1 both of which are incorporated herein by reference in their entirety.

Fibrous depth filter materials may incorporate natural fibers and/or polymer fibers, more specifically cellulosic fibers and polyethylene or polypropylene fibers, respectively. In addition, so-called step-index fibers may be used, wherein preferably the core portion is made of a polypropylene based polymer material and the outer layer is made of a polyethylene based polymer material.

The fluid-impervious layers may typically be provided as films made of a polymer material, especially a thermoplastic polymer material. Also, multilayered films may be used. Preferred multilayered films comprise a core layer which may be made, e.g., of a polypropylene based material and cover layers which may be made, e.g., of a polyethylene based material. The multilayered films may be prefabricated or assembled from, e.g., three, individual films upon demand.

In a preferred embodiment of the inventive filter element, the fluid-impervious layers not only abut and contact the surfaces but are materially bonded to the surfaces of the fluid-pervious sheet material in a fluid tight manner.

Bonding of the fluid-impervious layers in the form of a sheet material to the surfaces of the fluid-pervious sheet material may preferably be effected by laminating said fluid-impervious layer(s) onto the first and/or the second surface of the layer(s) of fluid-pervious sheet material.

The fluid-impervious layers may be provided according to one embodiment of the invention in the form of a prefabricated film.

In an alternative embodiment, the fluid-impervious layer is extruded onto the surface(s) of the fluid-pervious sheet material in the form of a film.

Preferably, the fluid-impervious layers are laminated to the first and/or second surface(s) of the layer(s) of fluid-pervious sheet material.

According to a further preferred embodiment, the fluid-impervious layer(s) may be bonded to the first and/or second surfaces of the layer of fluid-pervious sheet material under vacuum conditions.

In a further alternative embodiment of the invention, the fluid-impervious layer may be created in situ from particulate components, e.g., in fiber or granular form, which may be directly applied onto the surface(s) of the fluid-pervious sheet material and then processed to form the fluid-impervious layer(s) which fluid tightly contact(s) the surface(s) of the fluid-pervious sheet material.

Advantageously, the fluid-impervious layer(s) are made of a polymer material, preferably a thermoplastic polymer material, said thermoplastic polymer material being selected from polyolefin, especially polyethylene or polypropylene, as well as polyester and polyamide.

The layer of fluid-pervious sheet material may be selected from a variety of sheet materials. It is preferably selected from depth filter materials, e.g., in the form of a fibrous structure. Such fibrous structure preferably comprises fibers selected from cellulosic and polymer fibers or blends of the same. Preferred polymer fibers are thermoplastic fibers, especially polyolefin fibers. Preferable fluid-pervious sheet materials of this type are disclosed, e.g., in the U.S. Pat. No. 4,676,904 A to Schröder and the German utility model registration DE 87 13 306 U1 as mentioned above.

According to a further aspect of the present invention the fluid-pervious sheet material may comprise polymeric fibers which are compatible with the material the fluid-impervious layers are made of, thus facilitating and enhancing the bond of the fluid-impervious layer to the surface(s) of the layer of fluid-pervious sheet material.

Said fluid-pervious sheet material providing the fluid-pervious layer(s) may further comprise one or more additives, especially selected from organic and/or inorganic materials in fibrous, needle and granular form.

Preferred additives may be selected from kieselguhr, perlite, polyvinylpyrrolidone (PVPP) and silica gel, preferably in particulate form, and preferably bonded to the matrix of the surrounding fluid-pervious sheet material by a resin compatible with the further components of the fluid-pervious layer.

The amount of said one or more additives is preferably limited to about 80% by weight or less, based on the weight of the fluid-pervious sheet material.

According to a still further preferred embodiment, the fluid-impervious layer(s) arranged in between two adjacent layers of fluid-pervious sheet material have a thickness about equal to or larger than the surface roughness or surface irregularities of the fluid-pervious sheet material. Thus, a fluid tight contact to the surfaces of two adjacent layers of fluid-pervious material may be facilitated.

In order to improve the mechanical stability of the inventive filter elements the fluid-impervious layers arranged on opposite surfaces of the fluid-pervious sheet material are preferably made from compatible, more preferably from the same material.

In an especially preferred embodiment, the fluid-impervious layers on the opposite surfaces of the fluid-pervious layer are bonded to one another across the body of the layer of fluid-pervious sheet material, preferably by, e.g., needle shaped, microscopic bonds.

Such bonds can be easily created by providing a plurality of microscopic openings, e.g., in the form of pinholes or narrow slots, extending from one surface of the fluid-pervious sheet material to the other surface allowing the polymer material constituting the fluid-impervious layers to penetrate the body of the fluid-pervious layer and establish a plurality of bonds or bonding elements between the fluid-impervious layers on the opposite surfaces. These bonds enhance the mechanical stability of the individual layer as well as of the filter element as a whole. The penetrating of the polymer material upon forming the bonds is greatly facilitated when the fluid-pervious sheet material is provided in a dry condition.

Typically, the plurality of bonding elements extending from one of the fluid-impervious layers through the layer of fluid-pervious sheet material to the other one of the fluid-impervious layers are regularly distributed over the area of the layer of fluid-pervious sheet material.

According to a first aspect, the bonds may be designed with a small cross-sectional area parallel to the surfaces of the fluid-pervious sheet material and such that they do not noticeably affect the fluid flow along the fluid flow path within the body of the layer of the fluid-pervious sheet material. Preferably, the sum of cross-sectional areas of the bonds is about 2% to about 10%, more preferably about 3% to about 7% of the surface area of the fluid-pervious layer, e.g., about 5% or less.

According to a second aspect, the bonds may be provided along extended narrow slots and may be used in order to deflect the fluid flow and, furthermore, substantially extend the fluid flow path from the first to the second edge portions. Thus, the bonds may serve to modify and adapt the filtration characteristics of the filter element while the filtration capacity remains essentially unaffected.

In a preferred embodiment of the present invention, a first fluid-impervious layer is arranged at the first surface of the layer of fluid-pervious sheet material, and a second fluid-impervious layer is arranged at the second surface of the fluid-pervious sheet material, said first and second fluid-impervious layers being preferably made of compatible materials, especially polymer materials, which, more preferably may be directly bonded to one another when they are brought in contact with one another in a stack of filter elements.

Generally, it is preferable if said fluid-impervious layers are materially bonded to the layer(s) of fluid-pervious sheet material with a bonding strength equal to or larger than the peeling strength of the fluid-pervious sheet material in a direction perpendicular to the surfaces of the fluid-pervious sheet material. Fibrous fluid sheet materials typically have a wet strength of about 1 N/mm$^2$ or less.

According to a further aspect of the present invention filter modules including one or more of the filter elements according to the present invention are provided which may be set up in different ways.

According to one aspect of the present invention, a filter module comprises two or more of the filter elements arranged in a stack and directly bonded to one another. More preferably, the layers of fluid-impervious material provide for the bond(s).

In preferred embodiments of the inventive filter module the filter elements in the stack comprise a fluid-impervious layer only on the first surface of the fluid-pervious sheet material and the second surface of the fluid-pervious sheet material is bonded, especially in a fluid tight manner, to the fluid-impervious layer of an adjacent filter element, whereas one of the filter elements on the bottom or on the top of the stack (constituting an end surface) may comprise a second fluid-impervious layer bonded to the second surface of the fluid-pervious sheet material of said filter element.

As noted above, said first and second edge portions of each layer may be provided in a concentrical arrangement, i.e., the fluid-pervious sheet material is provided in the shape of a ring. Multiple layers stacked on top of one another provide a multilayer filter element of the module in a hollow cylindrical form.

According to another preferred embodiment, the inventive filter module comprises the sheet material of the one or more filter elements wound around a winding axis in multiple windings to form a spiral roll, preferably wherein adjacent surface areas (fluid-impervious layers or fluid-pervious and fluid-impervious layers) of the windings of the filter element(s) are in fluid tight contact, prefe-rably materially bonded, to one another.

Typically, the filter module according to the present invention further comprises a housing having an inlet opening in fluid communication with the inlet(s) of the filter element(s) and an outlet opening fluidly isolated/separated from the fluid inlet opening and in fluid communication with the outlet(s) of the filter element(s).

The inventive filter modules may comprise two or more of the filter elements arranged in a stack such that said first edge portion(s) of each layer are provided in fluid communication with each other and said second edge portions are provided in fluid communication with each other, preferably the filter elements being directly bonded to one another, optionally wherein the filter elements in the stack comprise a fluid-impervious layer only on the first surface of the fluid-pervious sheet material and the second surface of the fluid-pervious sheet material is bonded, especially in a fluid tight manner, to the fluid-impervious layer of an adjacent filter element, a filter element on the bottom or top of the stack preferably comprising a second fluid-impervious layer bonded to the second surface of the fluid-pervious sheet material of said filter element.

In certain embodiments, the filter module comprises on the top and/or on the bottom of the stack a fluid impervious layer in the form of a first and a second end plate, respectively, optionally said first end plate being designed as a fluid distribution device providing a fluid flow path from the fluid inlet of the module to the fluid intake(s) of the filter elements and/or said second end plate being designed as a fluid collecting device providing a fluid flow path from the fluid drainage(s) of the filter elements to the fluid outlet of the module, wherein in case an endplate is provided on the top and on the bottom of the stack, preferably one of the end plates is in the form of a fluid distribution device and the other end plate is in the form of a fluid collecting device.

In addition, in specific embodiments of the filter module said first and second end plates are designed as fluid distribution and fluid collecting devices and comprise a hollow chamber and have an inner rim around a central opening and an outer rim at the outer periphery, one of said rims comprising a plurality of openings providing a fluid communication to and from the hollow chamber in the interior of the end plate whereas the other rim being closed to seal off said hollow chamber to the environment.

In further specific embodiments, the filter module comprises said first and second end plates, which are designed as fluid distribution and fluid collecting devices and one of them having an inner rim around a central opening and the other one an outer rim at the outer periphery, said rims extending from the end plates in a direction away from the respective surface fluid tightly contacting the stack of filter elements.

According to another embodiment of the inventive filter module, the sheet material of the one or more filter elements is provided wound around a winding axis in multiple windings to form a spiral roll with an outer and an inner peripheral surface, said inner peripheral surface defining a central channel of the spiral roll, wherein the sheet material is provided with a first set of through-holes defining the first edge portions and being arranged such that they form one or more first channels extending radially in said spiral roll and wherein the sheet material is further provided with a second set of through-holes defining the second edge portions and being arranged such that they form one or more second channels extending radially and spaced apart from the first channels, said first or said second channels being open at the outer peripheral surface of the spiral roll and closed at the inner peripheral surface of the spiral roll;
and said other of said first and said second channels being closed at the outer peripheral surface of the spiral roll and open at the inner peripheral surface of the spiral roll; preferably wherein adjacent surface areas of subsequent windings of the spiral roll of the filter element(s) are bonded, especially fluid tightly sealed, to one another.

Quite often the filter modules comprise a first and/or a second end plate attached to the top and bottom front end of the spiral roll, respectively.

The end plates mentioned above in connection with the description of various embodiments of the present invention may be attached in a fluid-tight manner to the stack of filter elements or a spiral roll, preferably by materially bonding same to filter elements or the spiral roll.

When attached to a stack of filter elements, the end plate—also in case it serves as a fluid distribution or collecting device—may be directly bonded to a surface of a layer of fluid-pervious material without the need to have a fluid-impervious layer arranged in between.

Generally, the materially bonding may be effected in different ways, e.g., by the application of a gluing material. Preferably, the materially bonding is effected by heating a surface of the end plate designed to abut a filter element or a top or bottom end of a spiral roll, e.g., by infrared radiation, such that it softens or superficially melts and subsequently contacting the surface of the stack or spiral roll with the end plate.

Still, a further aspect of the present invention relates to a filter system comprising a housing and one or more filter modules as described above, said housing comprising an inlet opening in fluid communication with the fluid inlet(s) of the filter module(s) and an outlet opening fluidly isolated from the fluid inlet opening and in fluid communication with the fluid outlet(s) of the filter module(s).

According to still a further aspect of the present invention a process for manufacturing an inventive filter element is provided.

The process for manufacturing a filter element according to the present invention comprises the following steps
 a fluid-pervious sheet material is provided, preferably in the form of a coil;
 a fluid-impervious layer is provided in fluid tight contact with at least to the first or the second surface thereof; and
 the first and second edge portions are provided at a predefined distance and separated from one another by a predefined area of the fluid-pervious sheet material, preferably by punching.

In the process according to the present invention the fluid-impervious layer is provided according to a first embodiment as a preferably prefabricated film, preferably in the form of a coil, or is created according to a further embodiment in situ on one of the first and second surfaces of the fluid-pervious sheet material.

A fluid-impervious layer may be fluid tightly or sealingly bonded to both the first and second surfaces of the fluid-pervious layer.

The bonding of the fluid-impervious layer to the first and/or second surface to the fluid-pervious layer may be effected in a calendering step.

The fluid-pervious sheet material may be provided with a plurality of small openings in the form through-holes, e.g., pin-holes or narrow slots, regularly distributed across the surface area of the layer of fluid-pervious sheet material prior to the application of the fluid-impervious layer(s), and optionally the fluid-impervious layers on the first and second surfaces of the fluid-pervious sheet material may be bonded to one another via said small openings.

The advantages of the present invention and its various aspects will be discussed in more detail in connection with specific embodiments according to the attached drawings.

BRIEF DESCRIPTION OF THE DRAWINGS

FIGS. 13A and 13B show a further embodiments of inventive filter modules based on inventive filter elements in stacked form.

DETAILED DESCRIPTION OF THE DRAWINGS

Figure 1:
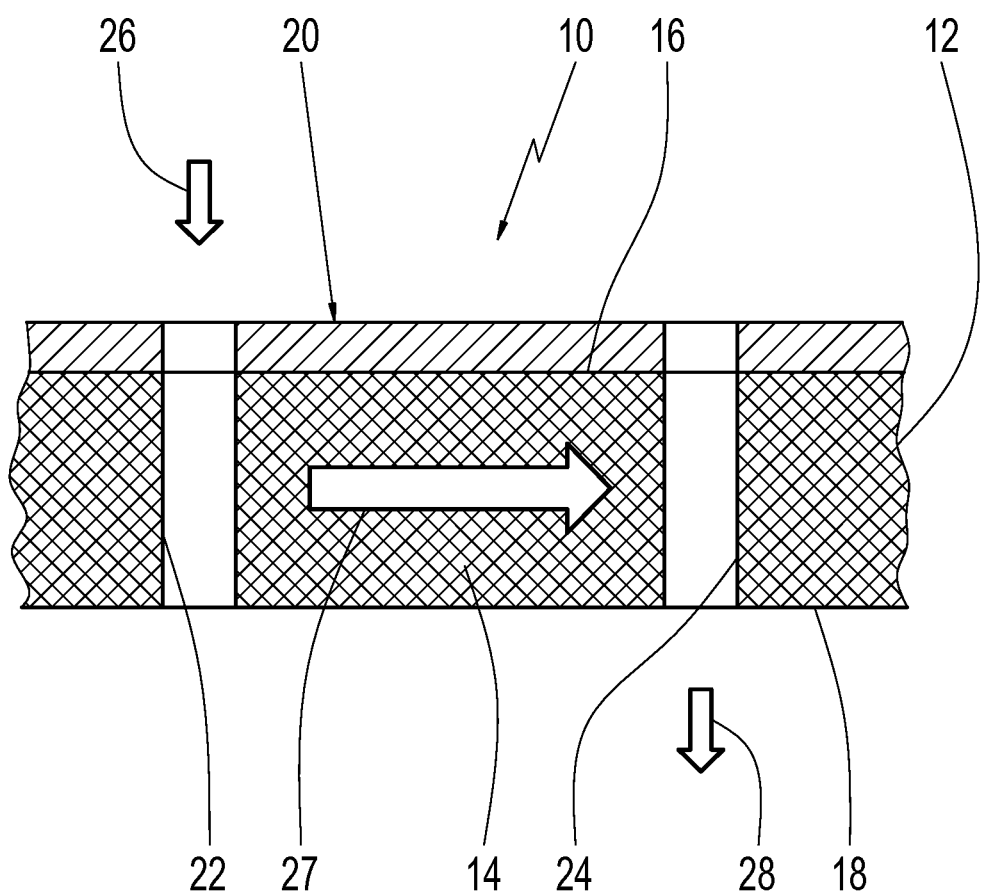
FIG. 1 shows a first embodiment of a filter element of the present invention.

FIG. 1 shows a first embodiment of the present invention in the form of a filter element 10, comprising one layer 12 of a fluid-pervious sheet material 14, having first and second surfaces 16, 18 in a substantially parallel arrangement. On the first surface 16 a fluid-impervious layer 20 is attached in fluid tight contact to substantially fully cover the first surface 16. The filter element 10 furthermore comprises through-holes 22 and 24, which provide first and second edge portions, respectively, in a predefined distance from one another.

When used as a filter element fluid enters the through-hole or channel 22, migrates through the first edge portion into and within the body of the fluid-pervious sheet material 14 and exits the filter element 10 at the second edge portion and through-hole or channel 24 as indicated by the arrows 26, 27 and 28, respectively.

Filter elements 10 may be easily assembled to filter modules of various filter capacities just by stacking the filter elements 10 on top of one another with the through-holes or channels 22, 24 being in fluid communication, e.g., in line. In such an embodiment, it is preferred that the fluid-impervious layer 20 sealingly, i.e., fluid tightly, abuts the second surface 18 of a subsequent filter element in the stack of the module and furthermore may be bonded to said surface 18 materially.

At an end surface 18 of such a stack, an additional layer of fluid-impervious material may be fluid tightly attached, such that the filter module may be easily handled and incorporated, e.g., into a housing, providing a fluid inlet and an outlet and further functionalities necessary for carrying out a filtration process.

Figure 2:
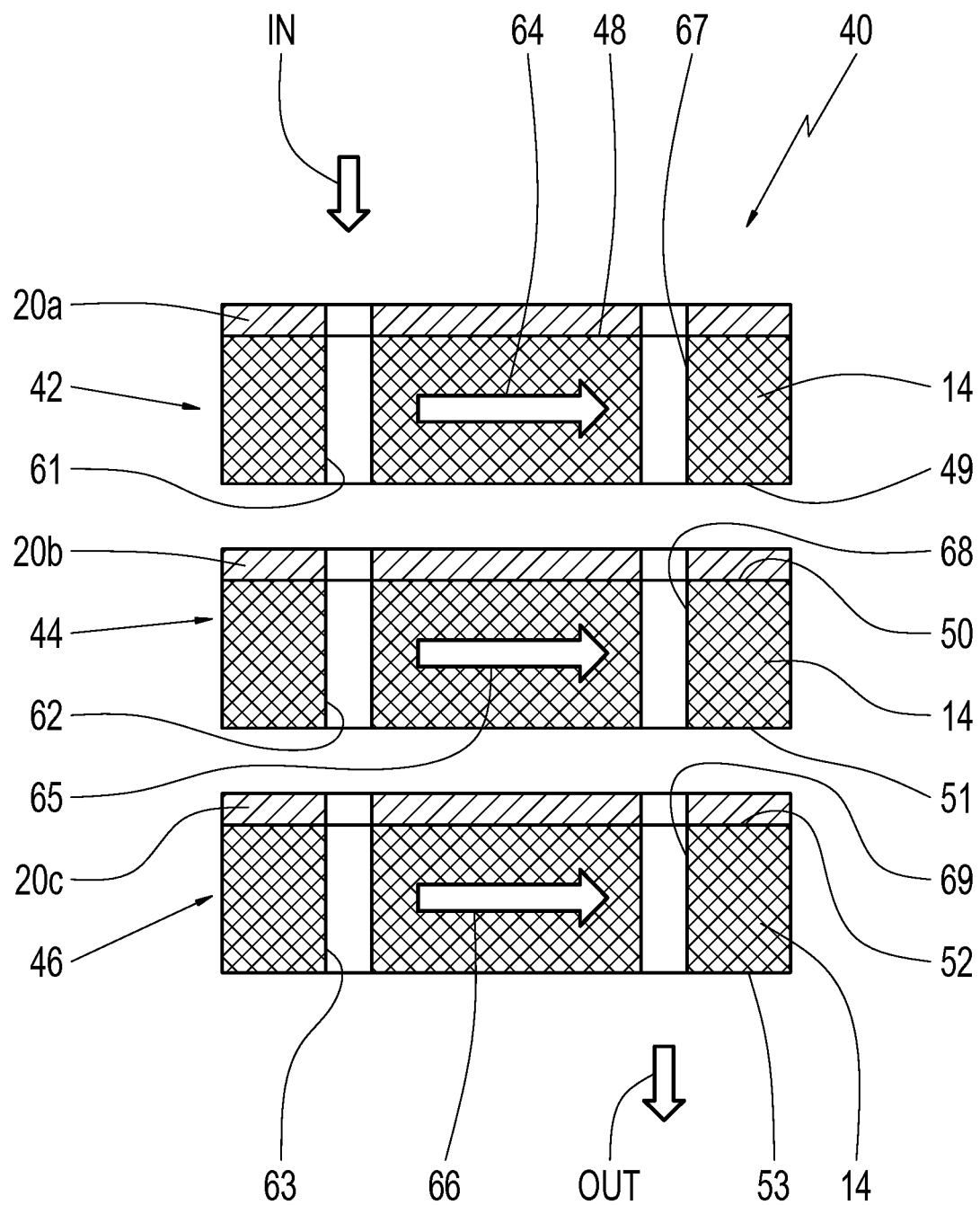
FIG. 2 shows a further embodiment of a filter element of the present invention.

FIG. 2 shows a more complex filter element 40 according to the present invention comprising three layers 42, 44 and 46 of fluid-pervious sheet material 14, each layer being covered on a first surface 48, 50 and 52 with a fluid-impervious layer 20a, 20b, 20c, respectively. The representation of FIG. 2 shows these three layers 42, 44, 46 in an exploded representation, whereas in reality these three layers are arranged in fluid tight contact to one another, where the fluid-impervious layers 20b and 20c abut a second surface 49, 51 of the layers 42 and 44, respectively.

In order to facilitate the use of the filter element 40, the end surface 53 of the stack of layers 42, 44 and 46 may also be covered by a fluid-impervious layer similar or identical to the layers 20a, 20b, 20c. Again, such layer (not shown) will be attached to the surface 53 in a fluid tight manner.

In operation, as indicated by an arrow IN fluid to be filtered is fed to a first series of through-holes 61, 62, 63 forming flow channels and providing a first edge portion. The fluid then migrates along the fluid flow paths, indicated by arrows 64, 65, 66 essentially parallel to the first and second surfaces of the layers 42, 44 and 46 to the second edge portions provided by the series of through-holes 67, 68, 69 (arranged as a flow channel) and exits the filter element as a whole as indicated by an arrow OUT.

Of course, the non-filtrate fluid may be fed into the aligned through-holes 61, 62, 63 from both ends of the channel formed in the filter element 40, i.e., from the top and bottom of the filter element 40.

Likewise, draining of the filtrate may occur on both sides of the filter element 40 from the channel provided by the aligned through-holes 67, 68, 69.

From a comparison of the embodiments of FIGS. 1 and 2 it is readily apparent that the filtration capacity of the inventive filter elements may easily be scaled up by stacking a larger multiplicity of layers as mentioned above already. Due to the fluid tight contact between adjacent layers, no excessive compression forces are needed to avoid leakage of fluid and to guarantee reliable results of the filtration process.

Figure 3:
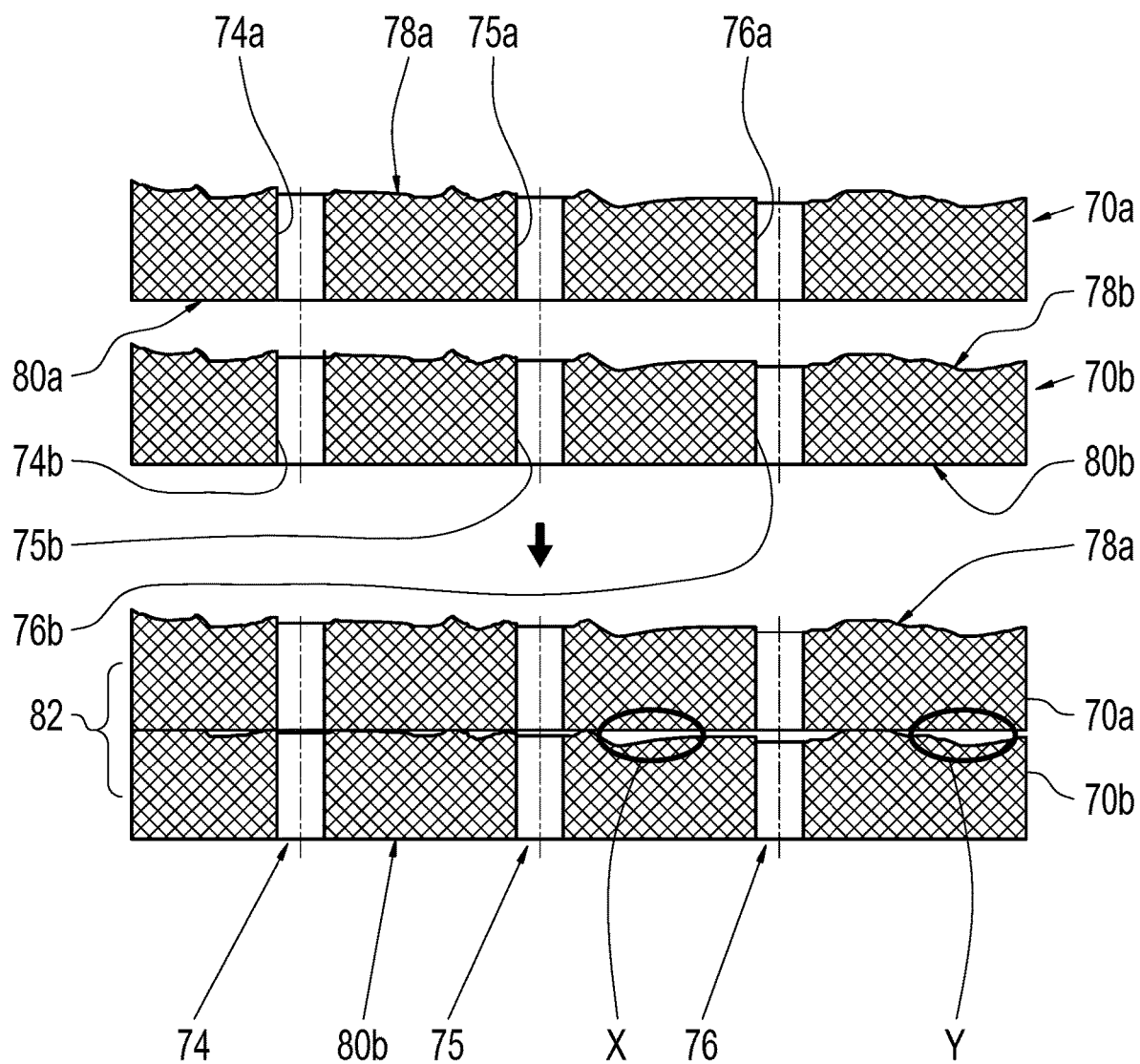
FIG. 3 shows a prior art filter element for reference.

FIG. 3 is provided to illustrate the problems encountered in the prior art when fluid-pervious sheet materials made of fibrous materials are used. In reality, such sheet materials are essentially flat on one of the surfaces only, whereas they show a substantial irregular structure on the opposite surface. Such structure is due to the manufacturing process of such fibrous materials. Similar problems may be encountered with other types of fluid-pervious sheet materials due to an irregular surface structure.

When two or more layers 70a, 70b are put together in a multilayer arrangement 82 as shown in the lower part of FIG. 3 in an attempt to provide a fluid tight contact of the upper and lower surfaces of the fluid-pervious sheet material, problems may arise as exemplarily indicated in portions X and Y. The number and the extension of the portions X and Y may be reduced by applying a substantial pressure on the multilayer arrangement 82.

Edge portions 74a/b, 75a/b, 76a/b provide fluid flow channels allowing fluid to be filtered to enter/exit the body of the fluid-pervious sheet material. For example, in case channel 75 is used as an inlet channel the fluid to be filtered may more or less unhindered, i.e., without migrating through the body of the fluid-pervious sheet material 70a, 70b, flow to the outlet channel 76, whereas fluid traveling into the direction of outlet channel 74 will at least to some extent have to migrate through the fluid-pervious sheet material 70a, 70b and be filtered. Thus, the portions X and Y are causing a leakage of fluid, i.e., irregular filtration results, which is detrimental to the quality of the filtrate.

Figure 4:
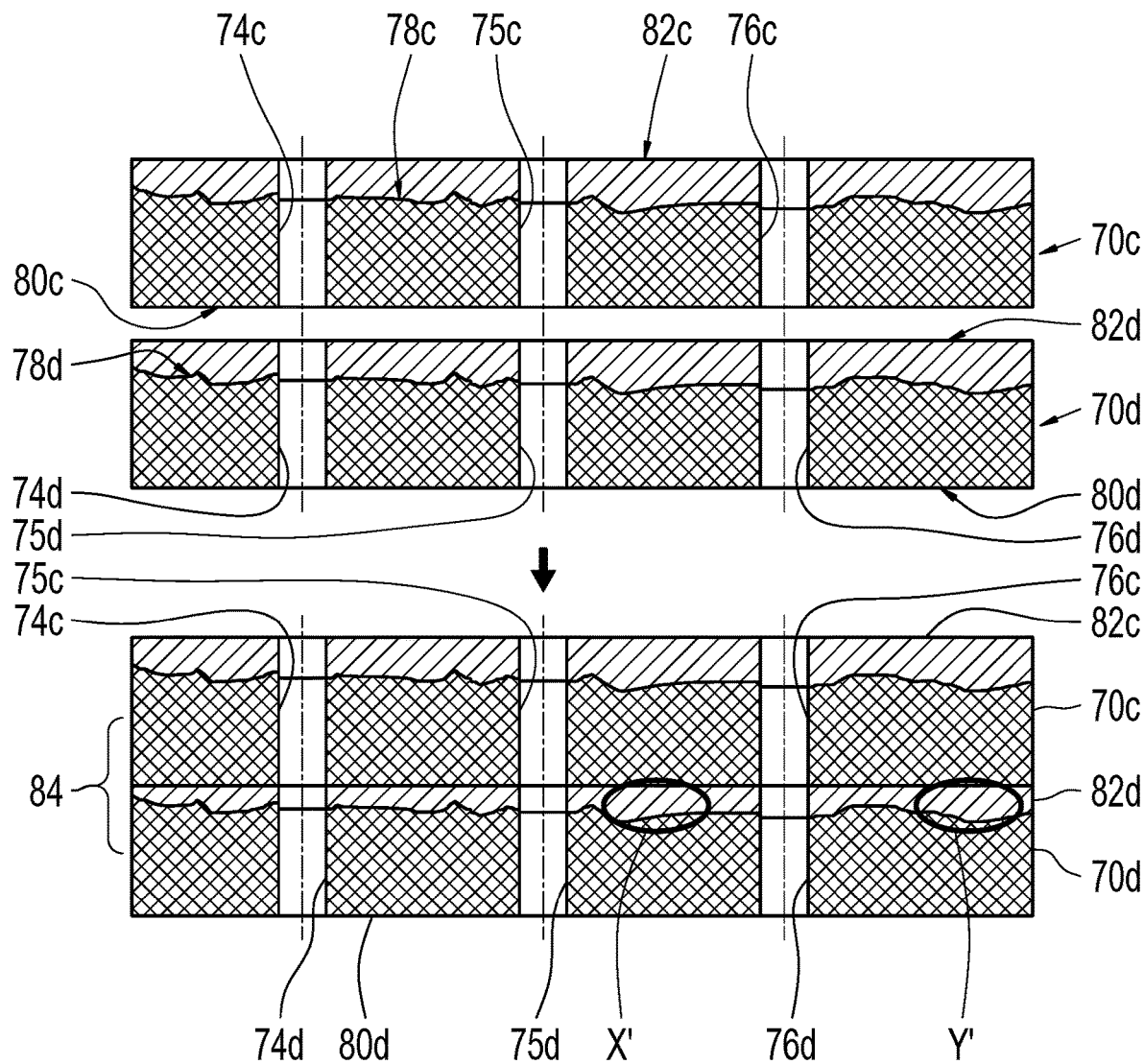
FIG. 4 shows a further embodiment of the present invention.

By covering the surfaces of the fluid-pervious sheet material with a fluid-impervious layer in a fluid tight manner, the present invention avoids such difficulties as is shown in FIG. 4.

The fluid-impervious layers are typically made of a plastics material which may be applied to the respective surface of the fluid-pervious sheet material under conditions which allow compensating and levelling an irregularly structured surface. Thus, regular fibrous fluid-pervious sheet materials as they are abundantly used in other filtration purposes may be used according to the present invention. The same is true for other types of fluid-pervious sheet materials, as indicated above.

FIG. 4 shows in the upper part two still separate layers of fluid-pervious sheet material 70c, 70d, corresponding to the fluid-pervious sheet material 70a and 70b of FIG. 3.

However, the sheet materials 70c and 70d are covered on their first surface 78c, 78d in a fluid tight manner by fluid-impervious layers 82c, 82d such that both surfaces now have a substantially flat levelled structure. This facilitates the assembly of the two layers into a multilayer arrangement 84 as shown in the lower part of FIG. 4, where fluid entering the through-holes 75c, 75d forming an inlet channel and providing first edge portions will mandatorily have to migrate through the body of the layers of fluid-pervious material 70c and 70d, respectively. Thus, at the second edge portions provided by the through-holes 74c, 74d and 76c and 76d forming outlet channels, respectively, a homogenous and reliable quality of the filtrate is obtained.

As indicated in the portions X' and Y', the specifically uneven portions of the upper surface of the layer 70d have been fully covered and levelled by the fluid-impervious material of layers 82d, such that the leakages occurring in sections X and Y as shown in FIG. 3 can be safely avoided without applying excessive pressure.

FIG. 5 schematically illustrates various embodiments of inventive filter elements in basic setups.

Figure 5A:
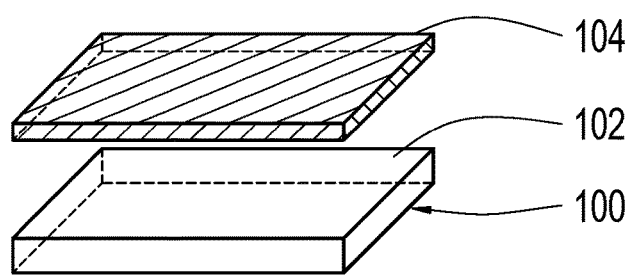
FIGS. 5A to 5D show various embodiments of a filter element according to the present invention.

In FIG. 5A a fluid-pervious layer 100 is combined on one of its surfaces 102 with a layer of a fluid-impervious material 104 (typically a polymer material) so as to provide a structure as shown for example in FIG. 1. Upon assembling the fluid-impervious layer fluid tightly contacts the surface 102 of the fluid-pervious layer 100. First and second edge portions for fluid feed and drainage may then be provided in the form of through-holes as shown in FIG. 1.

Typical layer thicknesses for the fluid-impervious layer 104 are about 100 µm to about 600 µm and are sufficient to cope with the surface irregularities of typical fluid-pervious sheet materials. The thickness of the fluid-pervious sheet material may vary broadly and may be in the range from about 1 mm to about 10 mm, preferably from about 3 mm to about 5 mm.

Figure 5B:
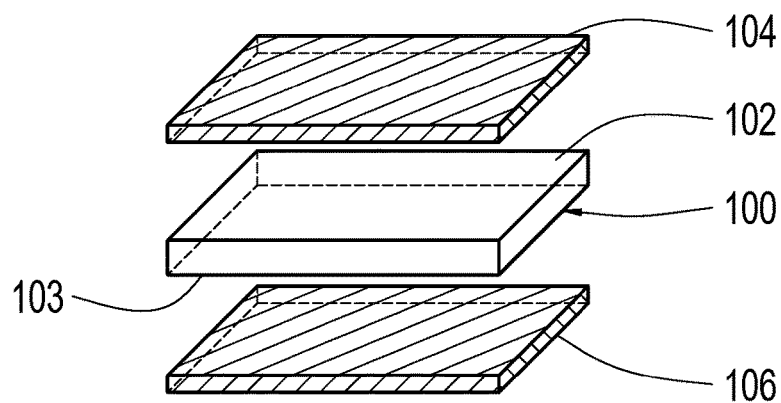

In the alternative embodiment according to FIG. 5B, the fluid-pervious sheet material 100 is covered and fluid tightly contacted on both of its opposite surfaces 102, 103 by sheets of 104, 106 of fluid-impervious material, e.g., a polymer material. Again, upon assembly the first and second edge portion may be created, e.g., in the form of through-holes (not shown).

Figure 5C:
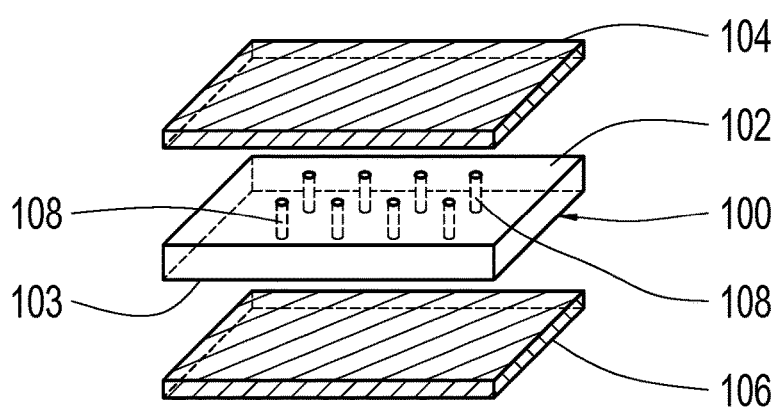

A modification of the structure of FIG. 5B is shown in FIG. 5C where the sheet of the fluid-pervious sheet material 100 is provided with microscopic openings in the form of pin-holes 108 penetrating the fluid-pervious sheet material 100 from its first surface 102 to its second surface 103.

Thus, when the fluid-impervious layers 104, 106 are subsequently applied to the surfaces 102, 103 of the fluid-pervious sheet material 100, by sufficiently heating the material of the fluid-impervious layers 104, 106 and upon application of an appropriate pressure, the polymer material of the fluid-impervious layers 104, 106 may enter and fill the pin-holes 108 and form bonds between the two layers 104, 106 extending through the openings 108 of the sheet 100. These bonds further stabilize the filter element mechanically such that it may be easier handled and, furthermore, provides for a higher pressure resistance of the filter elements as a whole. Surprisingly, these bonds may be created without detriment to the fluid-impervious properties of the layers 104, 106 due to their limited cross-sections parallel and perpendicular to the surfaces of the sheet 100.

In case the fluid-impervious material is polyethylene with a melting temperature in the range from about 130° C. to about 150° C. heating the assembled multilayer structure of FIG. 5C to a temperature of about 160° C. is typically sufficient to have the bonds established via the pin-holes 108. Typically, entering and penetrating the fluid-pervious sheet material via the pin-holes is facilitated once the sheet material 100 is in a dry state.

Through-holes (not shown) may be provided as shown in FIG. 1 to form the first and second edge portions defining the fluid flow path(s).

Typically, the pin-holes once filled with the polymer material providing bonds between the upper and lower fluid-impervious layers 104, 106 will not affect fluid flow within the fluid-pervious sheet material since their cross-sections as well as the sum of their cross sections parallel to the surfaces 102, 103 of sheet material 100 may be limited to about 5% of the surface area of the fluid-pervious sheet material 100 or less.

Figure 5D:
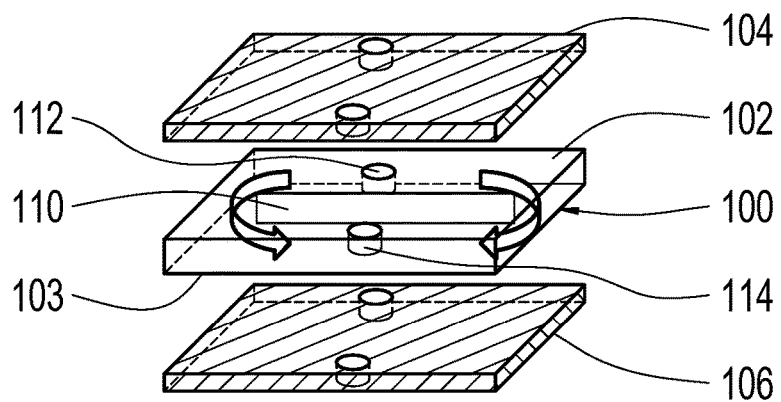

A further alternative to the structure of the filter element of FIG. 5C is shown in FIG. 5D, wherein the layer of fluid-pervious sheet material 100 is provided with an elongate narrow slot 110, extending from the first surface 102 to the second surface 103 of the fluid-pervious sheet material 100. The slot 110 may replace the pin-holes 108 in their function to provide a bond between the upper and lower fluid-impervious layers 104, 106.

The same measures as described for forming the bonds extending through the pinholes 108 will be sufficient to have the (polymer) material of the fluid-impervious material enter the narrow slot 110 and from a bond between the layers 104 and 106 all along the extension of the narrow slot 119. Again, the mechanical stability of the filter element is improved.

On both sides of the slot 110, first and second edge portions (channels 112 and 114) are provided at a predefined distance from one another.

Due to the arrangement of the two edge portions or channels 112, 114 on opposite sides of the narrow longitudinal slot 110, the fluid entering the channel 112 and migrating through the body of fluid-pervious sheet material 100, will have to flow around the area of the slot 110, filled with polymer material bonding the two layers 104, 106 together. Thus, the fluid flow path of the fluid from the first edge portion (channel 112) to the second edge portion (channel 114) is considerably longer than the mere distance of the two channels 114, 116. Again, the cross-sectional area of the bonds extending through the narrow slots 110 may be kept minimal as compared to the surface area of the sheet material and is not detrimental to the filtration capacity.

Thus, the filtration characteristics of the filter element may be modified by simple and economic means and the filtration properties of the filter elements may be adapted to the respective application.

The latter aspect discussed in connection with FIG. 5D will be described in detail in connection with the embodiments shown in FIG. 6.

Figure 6B:
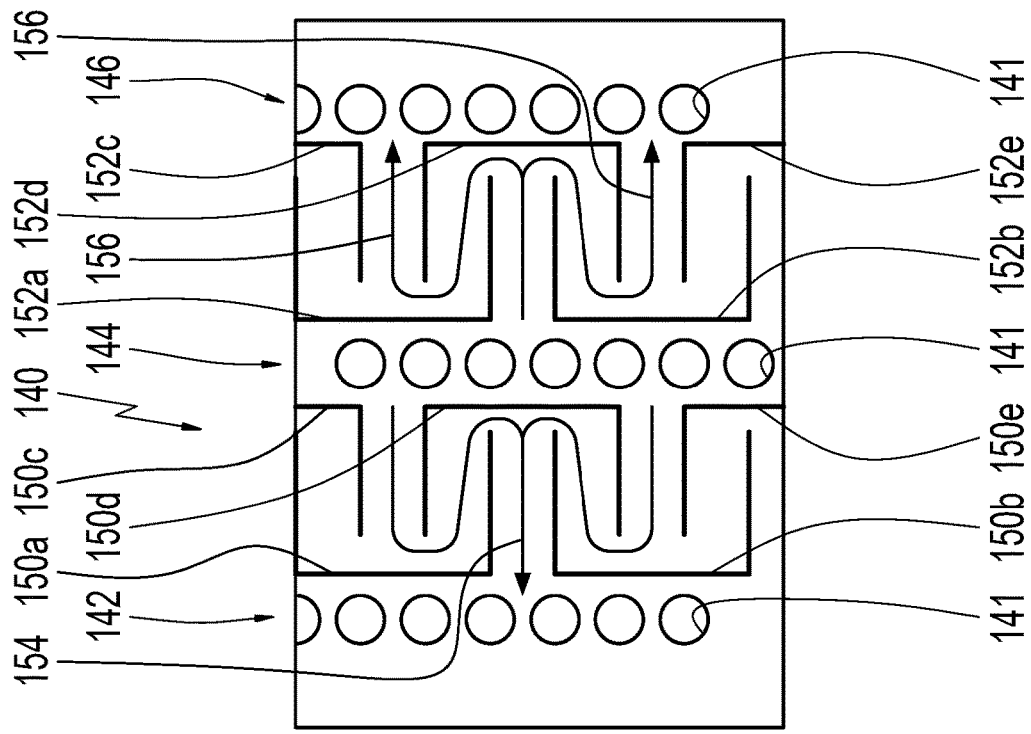
FIGS. 6A, 6B show two further embodiments of the present invention.
Figure 6A:
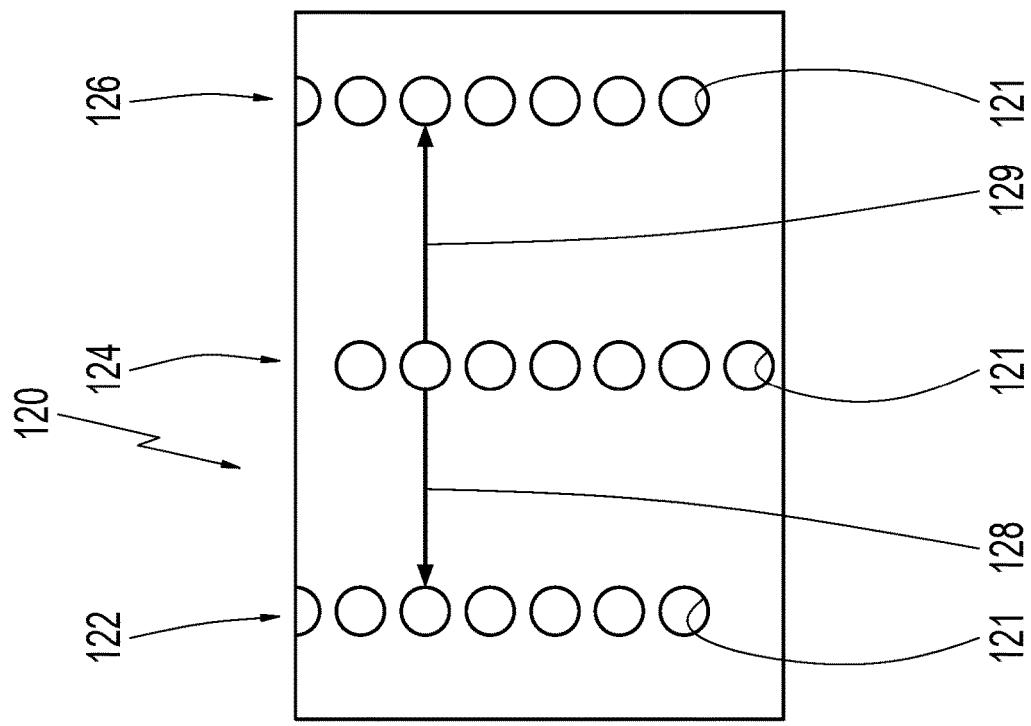

In FIG. 6A, a filter element 120 is shown in a top view. The filter element 120 is provided with a plurality of through-holes 121 arranged in three lines 122, 124 and 126. The filter element 120 may have a layered structure of a fluid-pervious sheet material and two fluid-impervious layers as exemplarily shown in FIG. 5B.

The individual through-holes of line 124 may provide first edge portions and serve as a fluid inlet, whereas the line of through-holes 122 and 126 may provide second edge portions for draining the filtrate. Thus, a fluid flow may occur from the line of through-holes 124 in more or less direct and straight paths to the second edge portions of the lines of through-holes 122 and 126 as indicated by the arrows 128, 129. In case pin-holes are provided (not shown) to bond the fluid-impervious layers on top and bottom of the fluid-pervious sheet material together as schematically shown in FIG. 5C, the fluid flow paths 128 and 129 remain essentially unaffected.

In FIG. 6B a filter element 140 is shown, where through-holes 141 are positioned within the filter element 140 along lines 142, 144 and 146. The line of through-holes 144 may serve to provide the first edge portions and the two lines of through-holes 142 and 146 may provide the second edge portions for fluid flow paths through the fluid-pervious sheet material of the filter element 140. The filter element may have a layered structure of a fluid-pervious sheet material and two fluid-impervious layers as exemplarily shown in FIG. 5B.

In order to modify the filtration characteristics in addition to mechanically stabilize the filter element 140, the fluid-pervious sheet material of the filter element 140 has been provided with a plurality of U-shaped narrow slot arrangements 150a, 150b, 150c, 150d, 150e and 152a, 152b, 152c, 152d, 152e, respectively, arranged between the lines of through-holes 144 and 142 and between the lines of through-holes 144 and 146, respectively.

The narrow slots provided between the lines of through-holes 144 and 142 and 146, respectively, are filled with fluid-impervious material of the fluid-impervious layers once the filter element 140 has been assembled, similar to what has been described in connection with FIG. 5D. The fluid-impervious material filling the slots serves as a bond between the fluid-impervious layers on the top and the bottom of the filter element 140 (not shown) as indicated in FIG. 5D.

In addition, these bonds influence and direct the fluid flow paths of the fluid within the fluid-pervious sheet material. When entering the fluid-pervious sheet material via the first edge portion provided by the through-holes of line 144 the fluid will have to migrate to the through-holes of lines 142 and 146, respectively, following a tortuous path as indicated by the arrows 154, 156 in FIG. 6B in contrast to what is shown in FIG. 6A. The fluid flow paths in this embodiment of FIG. 6B are about three times as long as in the embodiment of FIG. 6A.

As mentioned before, the filtration characteristics of the filter element 140 can thus be modified to a very large degree, although the general structure of the filter element may remain similar to the one of filter element of FIG. 5B.

In the following FIGS. 7 to 10, various apparatuses for efficiently manufacturing the inventive filter elements will be exemplarily described.

Figure 7:
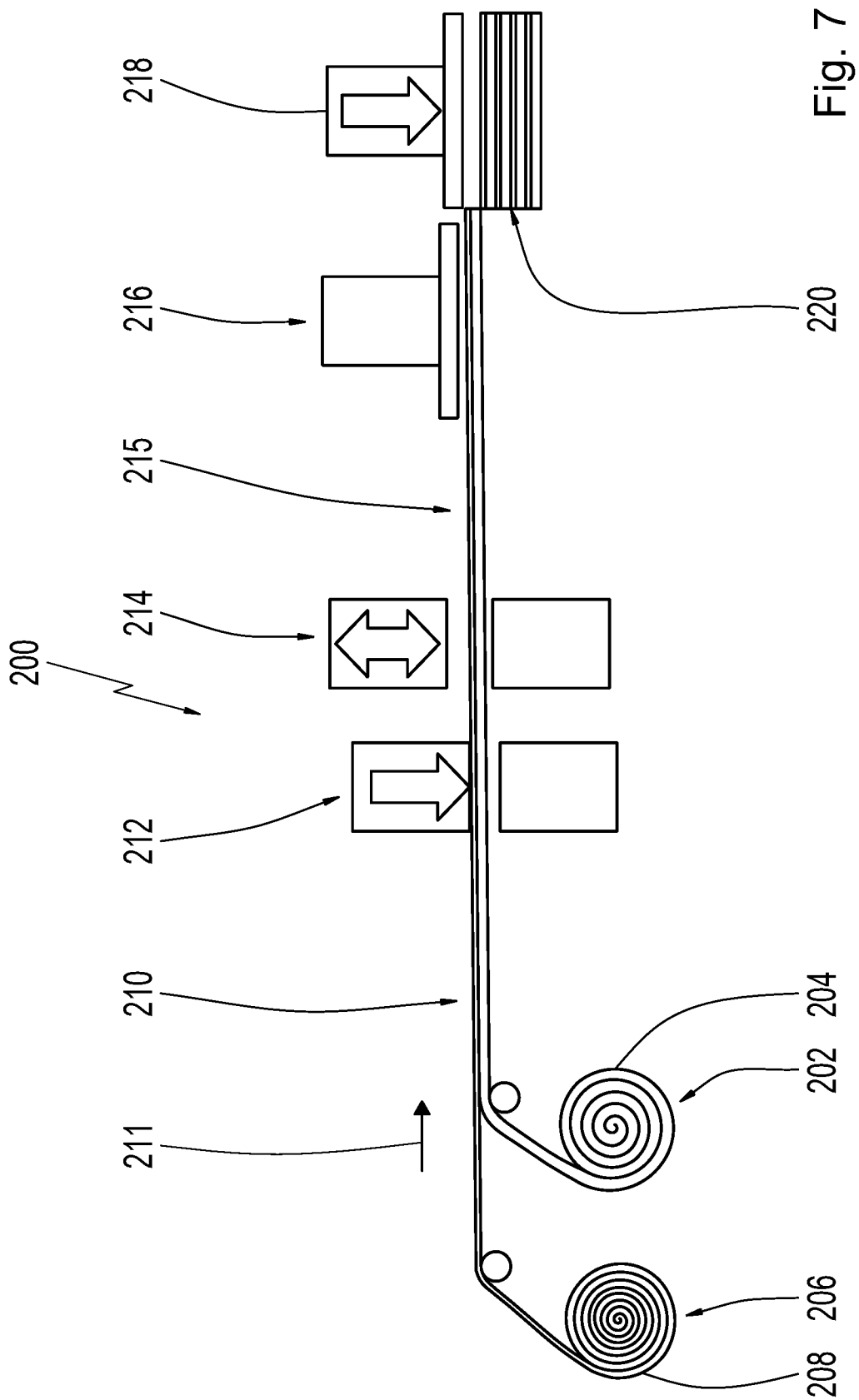
FIG. 7 shows a first method to produce the inventive filter elements.

FIG. 7 shows an apparatus 200 in a schematic representation for manufacturing filter elements according to the present invention and according to a process for manufacturing the same according to the present invention.

The apparatus 200 comprises a feed unit 202 for a fluid-pervious sheet material 204, which is typically provided in the form of a coil, as shown in FIG. 7. A further feed unit 206 provides a fluid-impervious layer 208, which is also typically provided in the form of a coil. Both feed units 202 and 206 provide the sheet material in a parallel orientation abutting one another, as is shown at the position 210 in FIG. 7.

Typically the fluid-pervious sheet material 204 may be of a fibrous structure as described, e.g., in the U.S. Pat. No. 4,676,904 A to Schröder and having a thickness of, e.g., 3.8 mm. The fluid-impervious layer 208 is typically provided as a polymer film, e.g., a polyethylene film of a thickness of 400 µm.

In the feed direction 211 downstream of position 210, a calendar 212 is provided, which serves to bring the two sheet materials 204 and 208 into close contact with one another and preferably heats the fluid-impervious layer 208 up to an extent that it materially and fluid tightly bonds to the fluid-pervious sheet material 204.

Downstream of the calender 212, a punching device 214 is provided for creating through-holes in the double layered material, which will serve to provide the first and second edge portions in a final filter element.

Subsequently, the double-layered sheet material 215 is optionally heated up at position 216 in order to firmly bond the impervious layer 208 to a surface of the fluid-pervious sheet material 204. In case the calender 212 has been equipped with a needle-roller (not shown) creating pin-holes in the fluid-pervious sheet material 204, the fluid-impervious material of the layer 208 may penetrate into the microscopic openings or pin-holes provided.

In a final step, the double-layered sheet material 215 is processed to form filter elements, either by cutting the endless sheet material 215 into predetermined individual sheets, which are stacked on top of one another and then assembled to a final multilayer filter element 220. Alternatively a filter element may be made by coiling the double-layered sheet material similar to what is described, e.g., in U.S. Pat. No. 8,464,877 B2 to Diemer et al. and shown in FIG. 12.

Pin-holes or narrow slots may be provided penetrating the fluid-pervious sheet material 204, e.g., by an additional equipment of the calender 212 (not shown). For example, a needle-roller may be provided as part of the calender 212 as mentioned above or may be arranged up-stream or down-stream of the calender 212 as a separate unit.

In a further alternative embodiment, the punching device 214 may also be used to provide microscopic openings or pin-holes or narrow slots, which serve to direct part of the molten material of the fluid-impervious sheet 208 to penetrate the fluid-pervious sheet material 204 and bond it to a subsequent layer, e.g., when forming the stack 220.

Figure 8:
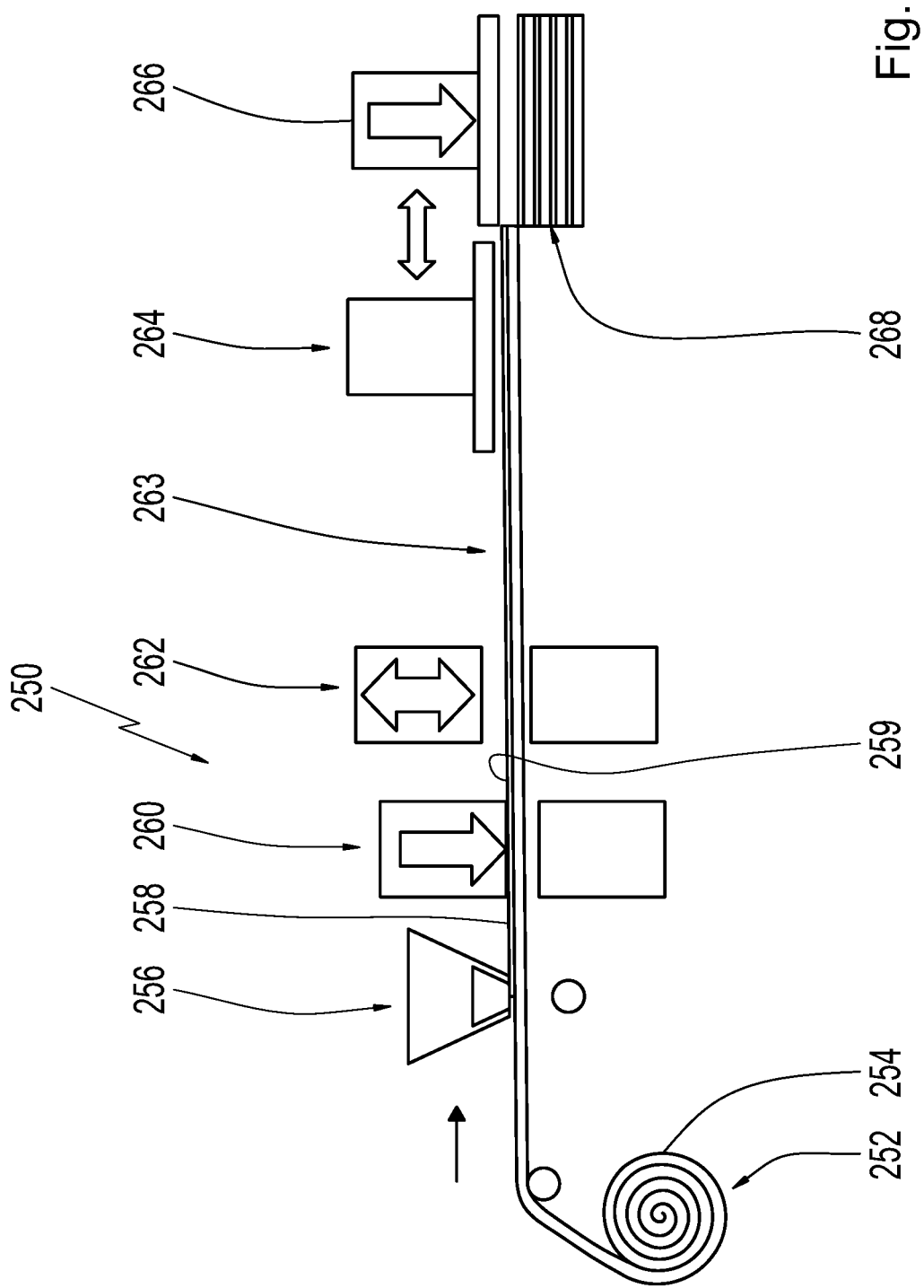
FIG. 8 shows a further embodiment to produce the filter elements of the present invention.

An alternative apparatus 250 is schematically shown in FIG. 8, which includes a feed unit 252 for a fluid-pervious sheet material 254, which is typically provided in the form of a coil.

Subsequent to the feed unit 252, a polymer distributor device 256 is provided which may distribute a thin layer 258 of a particulate material (typically a polymer material), e.g., in fibrous and/or granular form, on a first surface of the fluid-pervious sheet material 254, to form a fluid-impervious layer in a subsequent step in a calender unit 260, where the particulate polymer material is molten to form a continuous fluid-impervious layer closely contacting to the fluid-pervious sheet material 254.

Subsequently, as has been described in connection with the apparatus 200 of FIG. 7 already, a punching device 262 serves to punch or cut through-holes into the double-layered sheet material, thus providing for openings forming the first and second edge portions for the filter elements to be produced.

The heating unit 264 finally provides for an intimate fluid tight contact and bond between the fluid-impervious layer 259 and the fluid-pervious sheet material 254.

Subsequently, the endless double-layered material 263 is cut into shape in order to build the stacked filter element 268.

Again, as noted before, instead of a stack of sheet material a coil may also be formed in order to serve as a filter element.

Pin-holes or narrow slots may be provided in the fluid-pervious sheet material by separate units or by integrating further functions into calender 260 and/or punching device 262 similar to what has been described in connection with FIG. 7.

Figure 9:
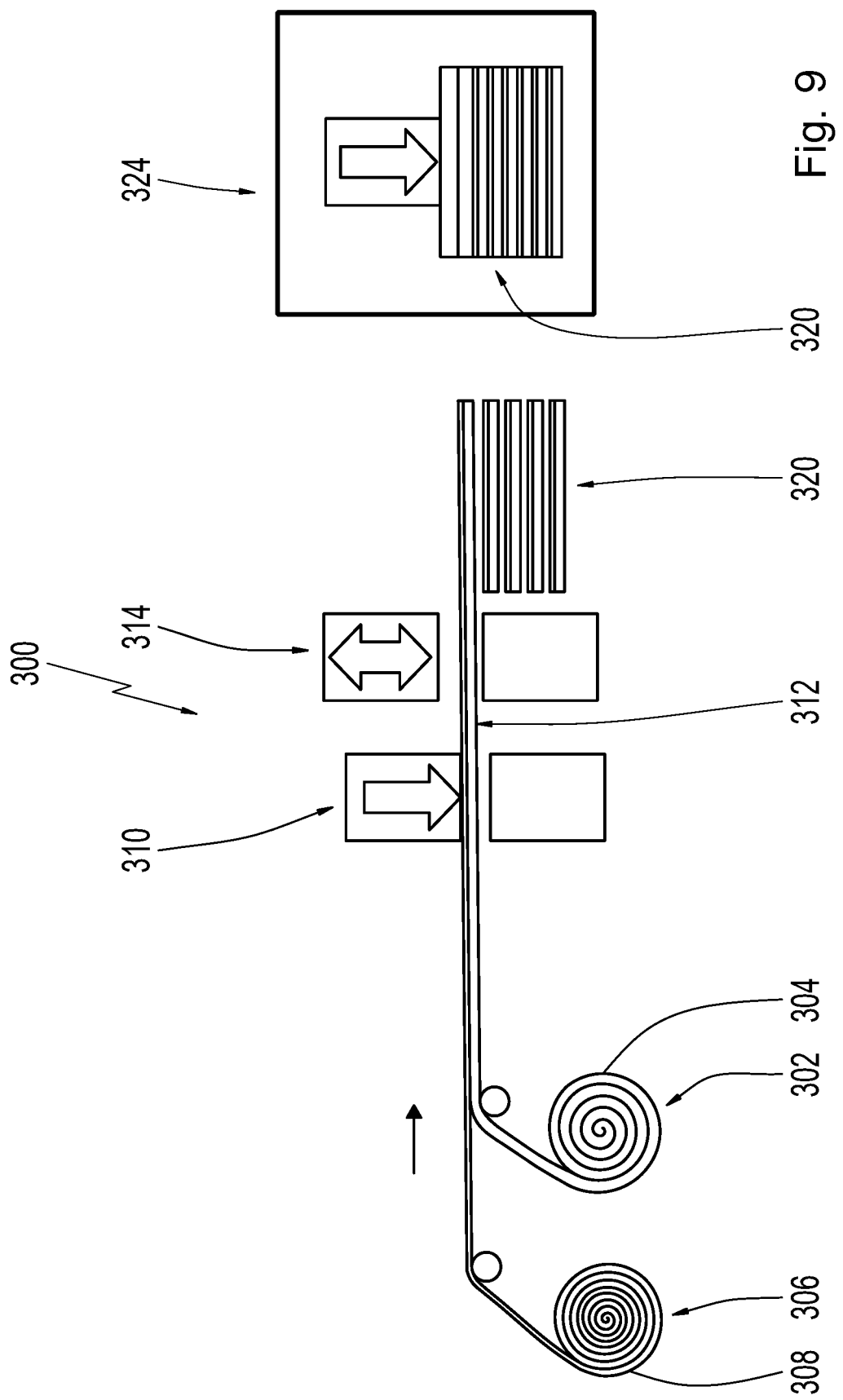
FIG. 9 shows a further embodiment for manufacturing the filter elements according to the present invention.

In FIG. 9 a further alternative apparatus 300 is schematically shown, wherein as in the apparatus 200 of FIG. 7 a fluid-pervious sheet material 304 is provided by a feed unit 302, whereas the fluid-pervious sheet material 304 is typically in the form of a coil.

Furthermore, a feed unit 306 provides for the fluid-impervious layer also in the form of a coiled sheet material 308, which is arranged in parallel to the fluid-pervious sheet material 304 and brought in fluid tight contact in calendering unit 310. Subsequently, the double-layered sheet material 312 is fed into a punching apparatus 314, which provides for through-holes in the double-layered material, which provide for the first and second edge portions of subsequently formed filter elements.

The double-layered material may be cut into the desired shape and assembled in a stack 320. The stack 320 may then be transferred to a heating station 324, wherein the stack 320 is compressed and heated up in order to provide for a close fluid tight contact and material bonding of the adjacent double-layered sheet materials.

Pin-holes or narrow slots may be provided in the fluid-pervious sheet material by separate units or by integrating further functions into calender 310 and/or punching device 314 similar to what has been described in connection with FIG. 7. Again, when forming the stack 320 and compressing and heating the same, the pin-holes and narrow slots, respectively, will be penetrated by the material of the fluid-impervious layers and bonds will be formed as described above.

Figure 10:
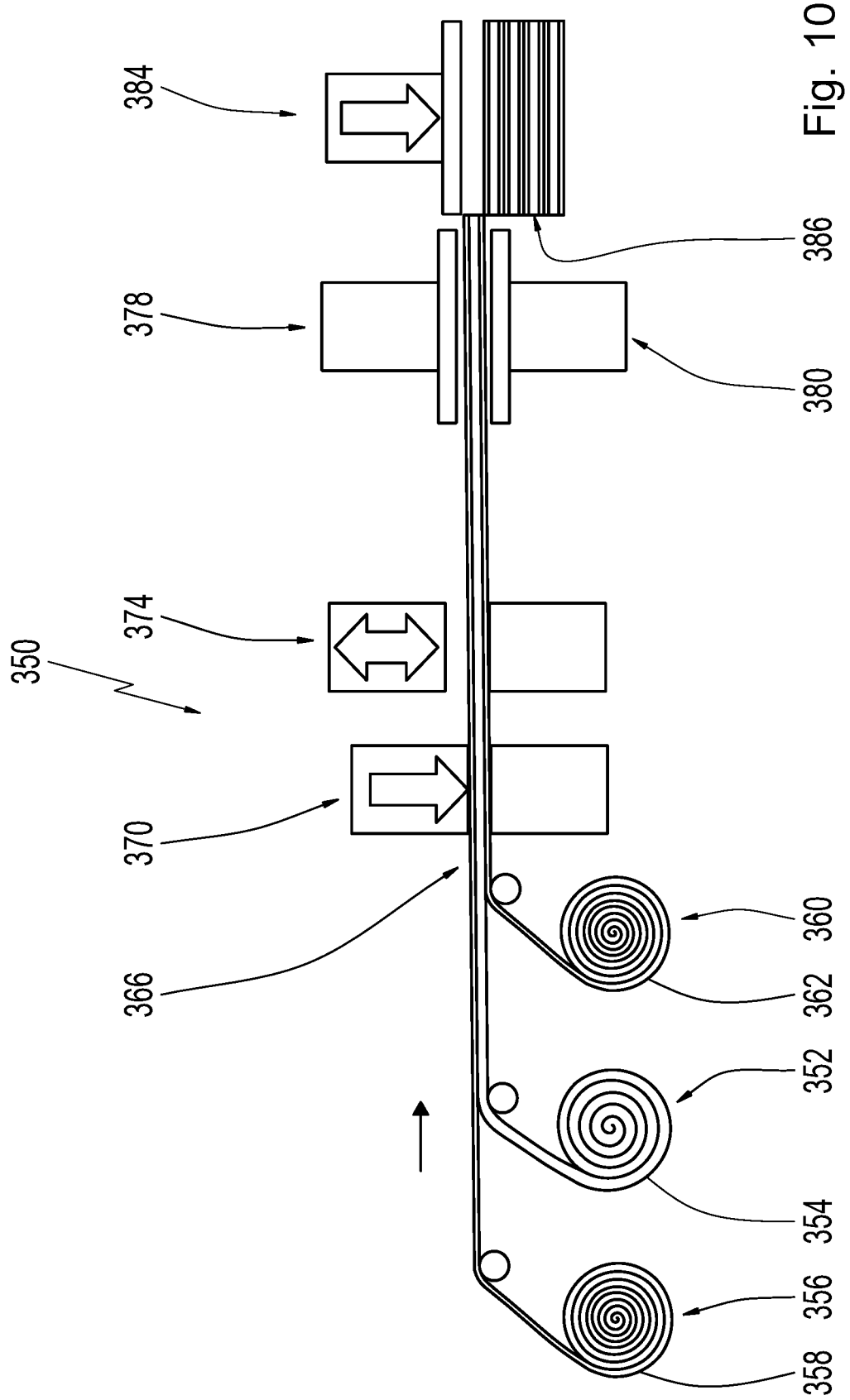
FIG. 10 shows a further embodiment for manufacturing the filter elements according to the present invention.

FIG. 10 shows a further apparatus 350 wherein a feed unit 352 provides fluid-pervious sheet material 354, typically in the form of a coil.

Upstream of the coiled fluid-pervious sheet material 354, a feed unit 356 is provided which feeds a fluid-impervious layer 358, typically from a coil, into the apparatus 350, to abut the upper surface of the layer of the fluid-pervious sheet material 354.

Downstream of the feed unit 352, a further feed unit 360 is provided which feeds a fluid-impervious sheet material 362 into the apparatus 350 so that it abuts the lower surface of the fluid-pervious sheet material 354.

Thus, downstream of the feed unit 360, a sandwiched structure 366 of a first sheet of fluid-impervious material 358, a fluid-pervious sheet material 354 and another fluid-impervious material 362 is provided, which is then passing through a calender unit 370 which brings the assembled layers into close contact with one another and especially provides a multilayer material which may be provided in the downstream punching unit 374 with through-holes forming first and second edge portions.

Downstream of the punching unit 374, a heating apparatus is provided with heating units 378, 380 on the upper and lower surfaces of the multilayer material 366 and the layers 358, 352 and 362 are brought into fluid-tight contact.

In the final unit 384, the multilayer material 366 is cut into shape in order to provide individual elements to be assembled into a stacked filter element 386. Otherwise, the multilayer material 366 may be coiled (not shown).

Pin-holes or narrow slots may be provided in the fluid-pervious sheet material 354 by separate units or by integrating further functions into calender 370 and/or punching device 374 similar to what has been described in connection with FIG. 7 already.

Upon forming the stack 386 or optionally already when passing through the heating units 378, 380 the pin-holes or narrow slots may be filled with material of the fluid-impervious sheets 358, 362 and form bonds between the fluid-impervious layers contacting the surfaces of the fluid-pervious layer 354 on top and bottom.

Figure 11:
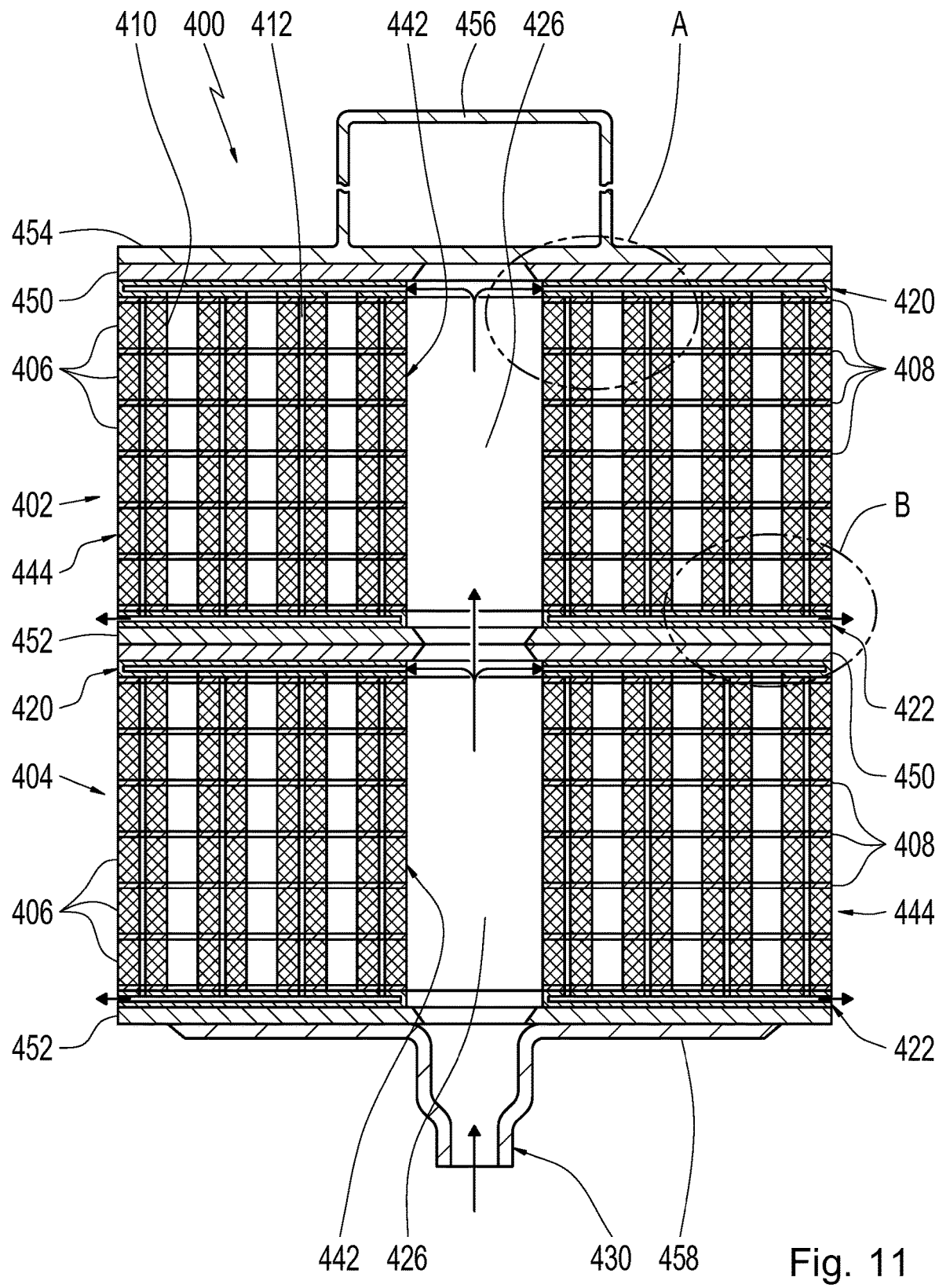
FIG. 11 shows an embodiment of an inventive filter module incorporating an inventive filter element.

FIG. 11 shows an exemplary embodiment of a filter module 400 according to the present invention. The module 400 comprises two filter elements 402, 404 which are comprised of a stack of layers 406 of fluid-pervious sheet material. In between the various layers of fluid-pervious sheet-material 406, layers 408 of fluid-impervious material are positioned which are in fluid-tight contact with the respective surfaces of the individual fluid-pervious layers 406.

The stacks of layers 406, 408 are provided with channels 410, 412 wherein the channels 410 having a larger diameter than the channels 412 and serve as fluid inlet channels for the non-filtrate whereas the channels 412 serve as drainage channels to receive and drain the filtrate.

Through-holes in the individual layers 406, 408 are aligned in the stack configuration of the layers in order provide the continuous fluid channels 410, 412 in each one of the filter elements 402, 404.

The modules 402, 404 comprise at the respective top ends an end plate which is designed as a fluid distribution device 420 whereas at the bottom of the stack a fluid collection plate 422 is provided. The stacks 402, 404 furthermore are provided with a central inlet channel 426 which is in fluid communication with an inlet port 430 of the filter module 400.

Figure 11A:
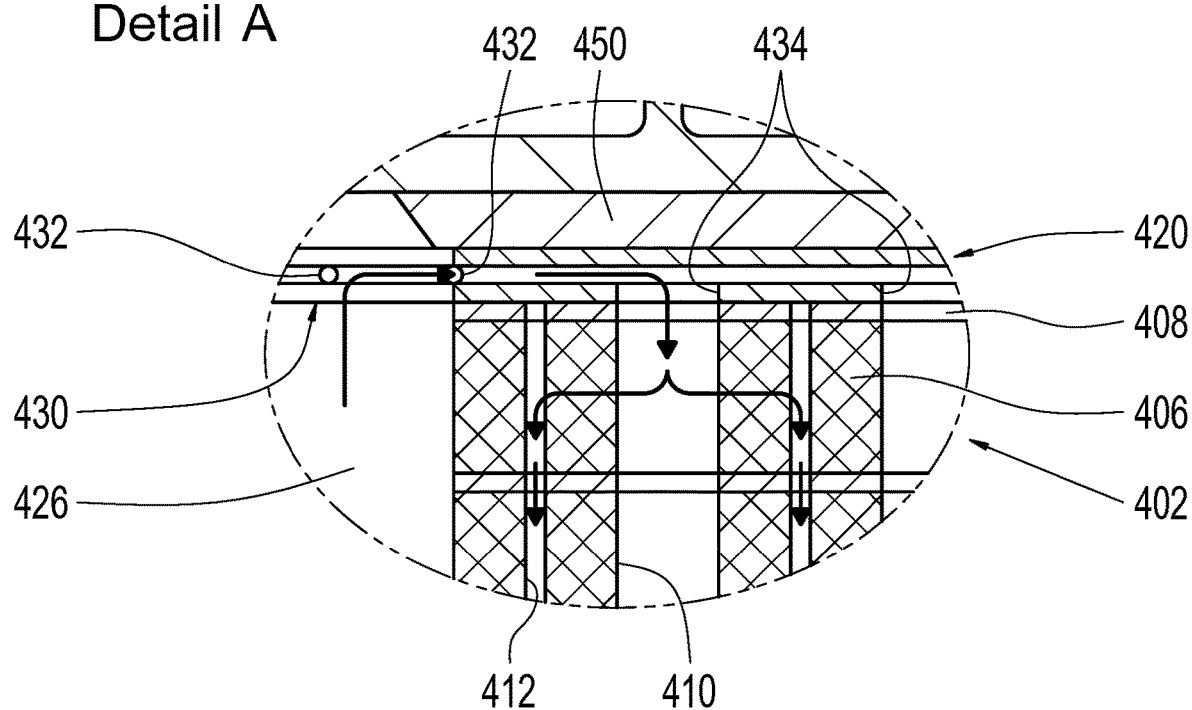
FIGS. 11A and 11B show two details of the filter module of FIG. 11.

The fluid distribution device 420 also comprises a central opening 428 which is preferably of about the same width as the channel 426. On the surface facing the channel 426, the distribution plate 420 is provided with a number of openings 432 which allow the nonfiltrate to enter the space within the distribution device 420 as shown especially in detail A (FIG. 11A).

The fluid distribution plate 420 is provided on its lower surface with openings 434 providing access to the channels 410 of the stack 402.

Thus, the non-filtrate enters the filter module 400 via the inlet 430, flows up within the channel 426 and enters the fluid distribution plates 420 through the openings 432. Then, the non-filtrate enters the stacks 402, 404 and their channels 410, respectively. The fluid then flows in a radial direction through the stacked layers 406 and is collected as a filtrate in the drainage channels 412 of the stacks 402, 404.

At the respective bottom of the stacks 402, 404, a filtrate collecting device 422 is positioned which is also of a disc-shaped structure, similar to that of the fluid distribution plate 420.

In contrast to the structure of the fluid distribution plate 420, the volume provided by the fluid collecting plate 422 is sealed off against the inlet channel 426 whereas on the outer periphery the fluid collecting plate 422 is provided with a plurality of openings 440 (cf. FIG. 11B) which allow drainage of the filtered fluid from the channels 412 to the outside of the filter modules 400 where it may be collected and directed to a fluid outlet (not shown in FIG. 11).

The interior surface of the stacks 402, 404 may be sealed off against the channel 426 according to one embodiment. However, this is not necessary for quite a number of applications, but the interior surface may be used as a further first edge portion which allows fluid to penetrate the fluid-pervious sheet material 406 directly from the central channel 426 and the filtrate will be drained through drainage channels 412 within the corresponding stacks, which are adjacent to the channel 426.

Similarly, the outer surface 444 of the stacks 402, 404 may be sealed off, but also left uncovered in numerous applications and allow an amount of filtrate to exit the individual layers of fluid-pervious material 406 directly to the environment of the filter module 400. The thickness of the endplates 450 and 452 may be, e.g., about 6 to about 7 mm.

The filter module 400 is preferably provided on its upper surface, i.e., on the upper surface of the fluid distribution plate 420, with a further end plate 450 and at the lower end with a further bottom plate 452, which further stabilize the mechanical structure of the individual stacks and makes it easier to handle them when forming the module 400.

On top of the module 400, a top plate 454 comprising a handle 456 may be provided in order to facilitate handling, e.g., inserting of the module into a filter housing or vessel and removing same. The top plate 454 closes the channel 426 at its upper end.

The fluid inlet 430 may be provided with a plate-shaped circular element 458 which provides further mechanical stability to the bottom portion of the filter module 400.

It is noted that, while in FIG. 11 the stacks 402, 404 of fluid-pervious and fluid-impervious sheets 406, 408 each have a top and a bottom layer 408, such top and bottom layers 408 of each stack 402, 404 may be avoided and the uppermost and lowermost layer 406 of fluid-pervious material may be directly bonded to the fluid distribution plate 420 and the filtrate collection plate 422, respectively.

Also, the fluid distribution plate 420 as well as the fluid drainage plate 422 may be designed such that they incorporate the function of the top and bottom plates 450, 452 which will result in an even more simplified procedure when assembling the filter module 400.

Figure 12:
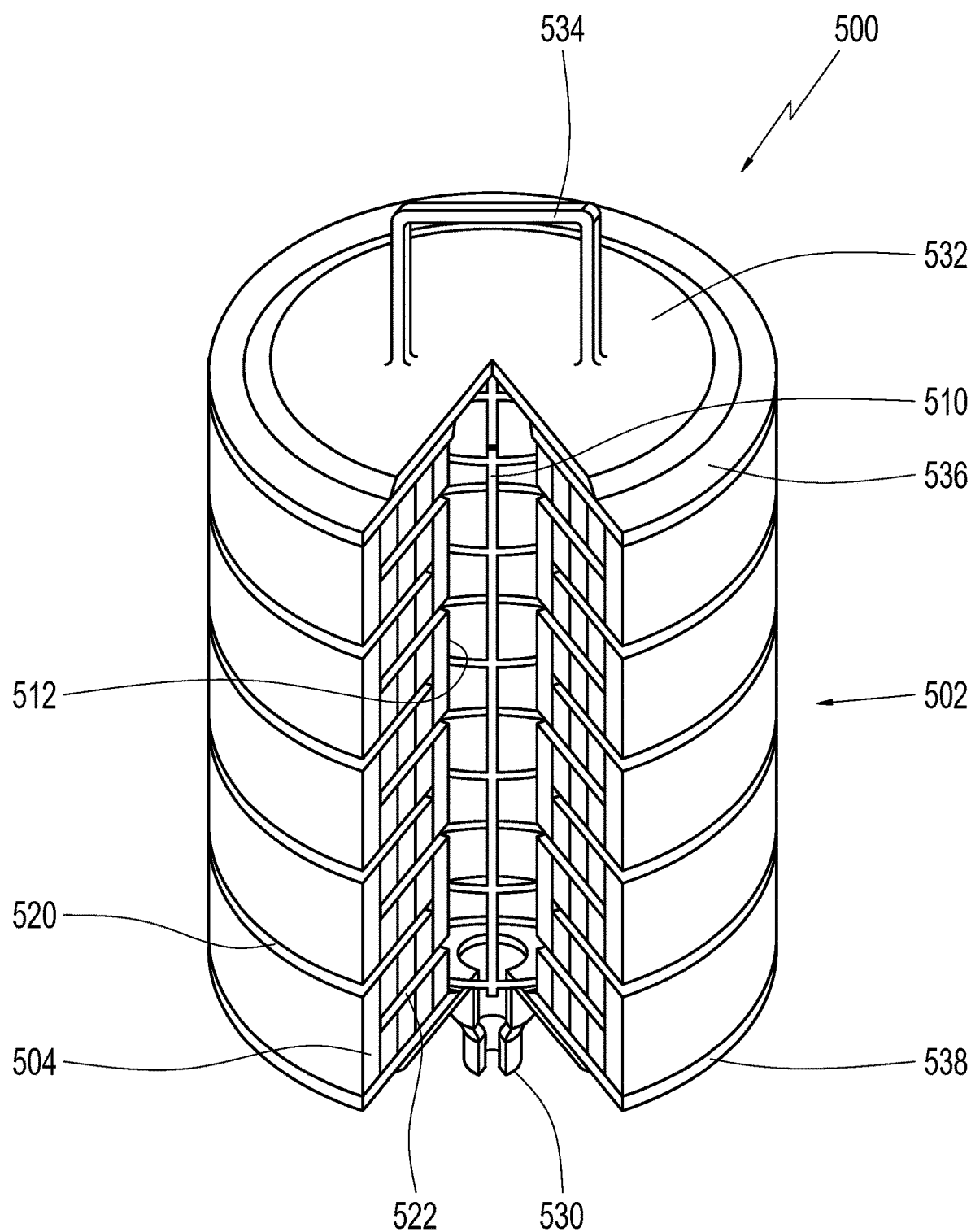
FIG. 12 shows a further embodiment of an inventive filter module incorporating an inventive filter element in coiled form.

FIG. 12 shows a filter module 500 where a double layer 504 of fluid-pervious sheet material and a fluid-impervious sheet material, for example as obtained from the process described in connection with any one of FIGS. 7, 8 and 9, is wound up into a coiled form around a cylindrical supporting structure 510 which defines the inner diameter of a central channel 512 of the filter module 500. Prior to winding up the double-layered material 504 to a spiral roll 502, the double-layered sheet material 504 is provided with slot-type openings 520, 522 in a similar way as it has been described in the above-referenced U.S. Pat. No. 8,464,877 B2 to Diemer et al. (cf. especially FIGS. 1 and 3). In the coiled form of spiral roll 502, the slots 520 form channels which are open at the outer periphery of the spiral roll 502 and closed at the inner end thereof whereas the slot-type openings 522 form channels which are open at the inner periphery of the spiral roll 502 and closed at the outer periphery as is readily apparent from FIG. 12.

Again, fluid entering the filter module 500, e.g., by a fluid inlet 530 at the bottom of the module 500, will flow up in channel 512 to the top of the filter module 500 which is closed by a top plate 532 which incorporates a handle 534.

While the top plate 532 may extend across the whole diameter of the spiral roll 502, it may be supported as shown in FIG. 12 by a separate circular end plate 536 which is structured similarly to a bottom end plate 538 to which the fluid inlet 530 may be attached. Thus, the fluid flowing up from the fluid inlet 530 to the top plate 532 will then be forced to enter into the channels 522 which in this operational mode serve as inlet channels for the nonfiltrate, then travel along the longitudinal direction of the filter module 500 up or down into the adjacently provided outlet channels 520 where the filtrate then exits the module 500 to the surrounding space of the spiral roll 502 which is typically limited by a filter housing (not shown).

The coiling of the inventive filter element, i.e., the spiral roll 502, is much simpler than what is described in the afore-mentioned U.S. Pat. No. 8,464,877 B2 to Diemer et al. in that the layers abutting one another may be directly, fluid-tightly bonded to one another and no additional compressing and/or sealing elements between the adjacent windings are necessary. Furthermore, the fluid-tight contact of subsequent layers of the spiral roll 502 ensures that no leakage may occur so that a high quality and high filtration efficiency may be provided.

It is readily apparent that the mode of operation of the filter module 500 may be reversed. Fluid to be filtered will then be fed to the outer periphery of the module 500, enter the channels 520, migrate through the fluid-pervious material of the layers 504 of the spiral roll 502 and filtrate may be drained via channels 522 to the central channel 512. The tubular part 530 (referred to as fluid inlet in the first mode of operation described above) will then serve as a fluid outlet of the filter module 500.

FIG. 13A shows a further embodiment of an inventive filter module 550 which is set up by a multiplicity of double layers of fluid-pervious and fluid-impervious layers as obtained, for example, in the process as described in connection with anyone of FIGS. 7 to 10.

The individual double (or triple) layers 552 are provided with through-holes to form channels 554, 556 which, when assembled to a stack, extend from the top to the bottom of the stack of layer material 552.

On top of the stack of layers 552, a top plate 558 is provided which has throughholes 560 which are placed in line with the channels 554. At the bottom of the stack of layers 552 and to the bottom of the stack, a bottom plate 564 is attached which has a multiplicity of through-holes 566 which are lined up with the channels 556 of the stack of layers 552.

In addition, the top plate 558 has a central opening 568 surrounded by a ring-shaped projection 570. The bottom plate has a ring-shaped projection 572 at the outer periphery corresponding to the outer periphery of the stack of layers 552 and a central opening 574 the diameter of which is the same as the diameter of the central opening 568 of the top end plate 558.

The diameter of the openings 568 and 574 is in addition compatible with the diameter of an inner channel 576 provided in the center of the stack of layers 552.

Thus, fluid may be provided from the outer periphery of the filter module 550 entering into the channels 554 via the through-holes 560 of the top plate 558, migrate through the fluid-pervious sheet material of the layers 552 and exit the fluid-pervious material of the layers 552 into the channels 556. From these channels 556, the fluid may be drained via the openings 566 of the bottom plate.

The module 550 as described in connection with FIG. 13A may be easily assembled to larger filtering entities as shown in FIG. 13B where a number of four filter modules 550 are fluid-tightly connected to one another via the outer projecting rims 572 and ring-shaped projections 570, respectively.

While the top module 550a is provided with a sealing cap 580 closing the central fluid channel 582, the opening 568 of the lowermost module 550d is provided with a fluid outlet tube 584.

As indicated in FIG. 13B, fluid may be provided from the outside of the filter modules 550a to 550d and enter the modules from their outer periphery as well as through the openings 560 of their end plates 558 and the filtrate is drained via the channels 556 within the individual modules, collected in the space provided by the bottom plate 564 of each module and collected in the central channels 576. The channels 576 of each one of the modules 550a to 550d are aligned to one continuous channel 582 which allows draining the filtrate from all of these four modules via one common outlet 590.

It is again readily apparent from FIGS. 13A and 13B that the fluid flow for filtering fluid may be reversed such that fluid to be filtered is fed into channel 576 (or 582). The fluid then is distributed by the bottom plates 564 into the plurality of channels 566, migrates through the fluid-pervious layers of the double (or triple) layers 552 to be collected as a filtrate in the channels 554 and exit the module 550 via the openings 560.

For both modes of operation the outer and/or inner peripheral surfaces of the module 550 may be sealed off or let uncovered and will in the latter case contribute to filtration capacity.

Figure 11B:
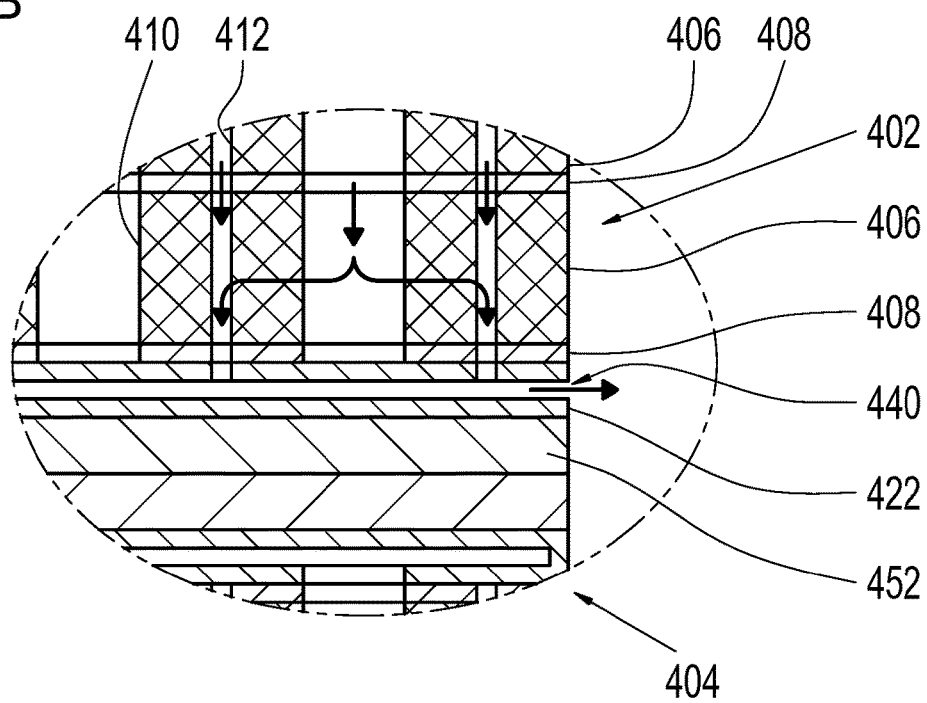
Figure 14:
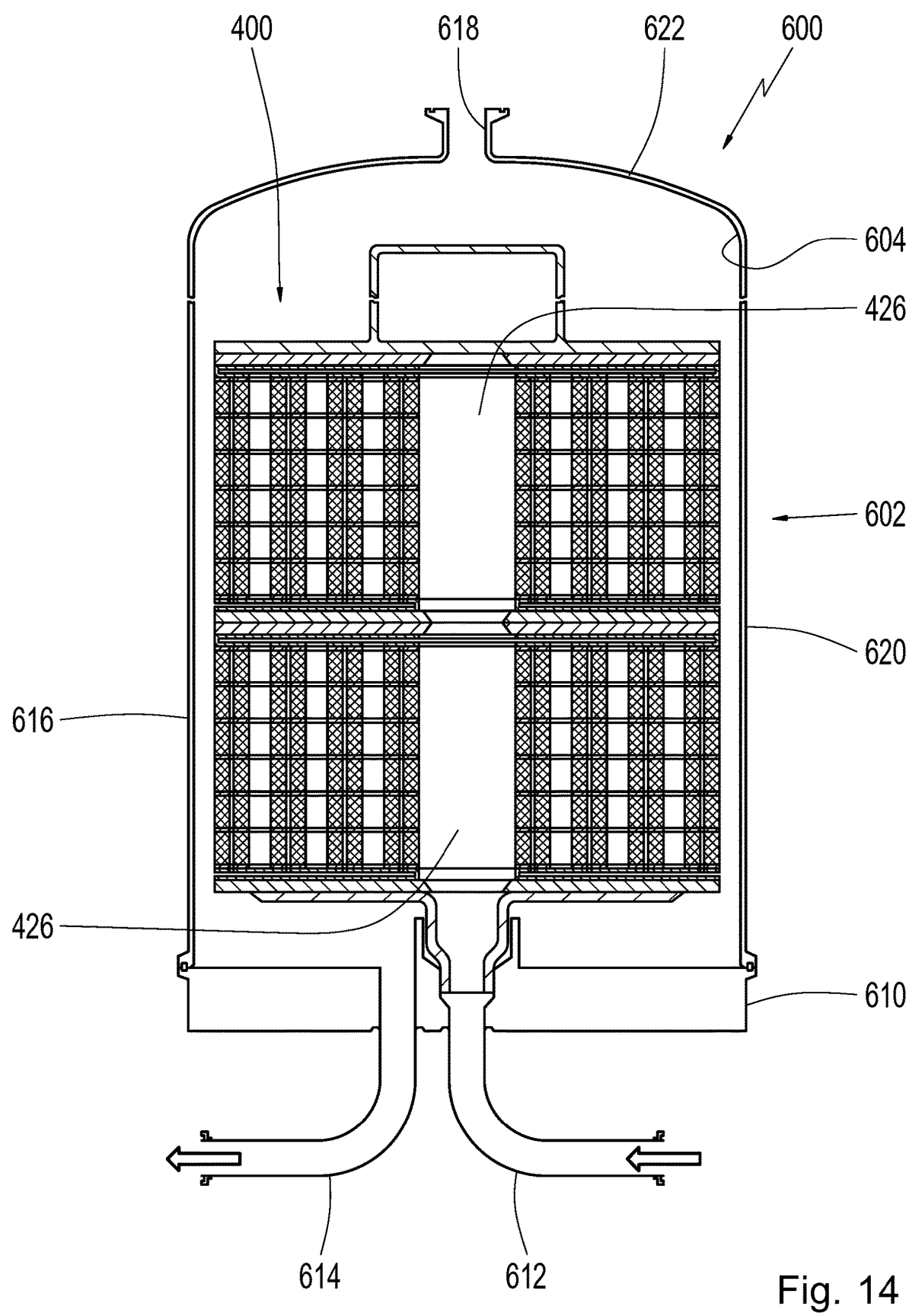
FIG. 14 shows an embodiment of an inventive filter system incorporating a filter module of FIG. 11.

FIG. 14 shows a filter system 600 comprising a housing 602 which provides an inner space 604 to accommodate a filter module, e.g., a filter module 400 as described in detail in connection with the FIGS. 11, 11A and 11B. The housing 602 is typically provided in a two-part form with a bottom plate 610 which provides for a fluid inlet 612 and a fluid outlet 614 and a top portion 616 providing for the interior space 604 to accommodate the filter module 400.

At the top end of the housing 602, a venting opening 618 may be provided which allows in the beginning of the operation of the filter system 600 to vent the air included in the housing to escape, and once the interior 604 of the housing 602 is filled with the fluid to be filtered, the opening 618 may be closed.

During filtration operation of the filter system 600, the fluid enters, e.g., into the fluid inlet 612, flows up into the central channels 426 of the stacks 402, 404 of the filter module 400, is distributed into the various channels 410 of the stacks 402, 404 and then exits the filter module 400 via the channels 412 and the filtrate collecting plates of the module to accumulate in the interior 604 of the housing 602 to be drained via the fluid outlet 614.

For some embodiments, it may be advantageous to have the upper part 616 of the housing 602 be divided into a lower cylindrical part 620 and a separable top portion 622.

As is easily understood, the operation of the filter system 600 and the filter module 400 may be reversed such that the tubing 614 serves as a feed inlet and the filtrate is drained via the tubing 612.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A or B), unless otherwise indicated herein or clearly contradicted by context. The terms "comprising," "having," "including," and "containing" are to be construed as open-ended terms (i.e., meaning, "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indication any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

The invention claimed is:

1. A filter element comprising
one or more fluid-pervious layers of a fluid-pervious sheet material having first and second surfaces in a substantially parallel arrangement, the first and second surfaces each having a surface roughness;
a fluid-impervious layer arranged in fluid tight contact with at least one of said first and second surfaces of said one or more layers of fluid-pervious sheet material to fully cover the first and/or second surfaces thereof, providing a substantially flat leveled surface on the at least one of said first and second surfaces of said one or more layers of fluid-pervious sheet material;
one or more first and second edge portions, said one or more first and second edge portions being arranged at a predefined distance and separated from one another by a predefined area of the fluid-pervious sheet material,
a fluid flow path having an upstream end and a downstream end, the fluid flow path limited to and extending essentially parallel to the first and second surfaces from the one or more first edge portion(s) to the one or more second edge portion(s) within each of said one or more layers of fluid-pervious sheet material, wherein fluid flow along the fluid flow path is exclusively limited to flow within each of said one or more layers of fluid-pervious sheet material; said one or more first and one or more second edge portions providing a fluid intake and a fluid drainage at the upstream and downstream ends of said fluid flow path, respectively.

2. The filter element of claim 1, wherein the one or more fluid-impervious layers are materially bonded to the at least one of the first and second surfaces of the fluid-pervious sheet material in a fluid tight manner.

3. The filter element of claim 1, wherein said one or more fluid-impervious layers are in the form of a film.

4. The filter element of claim 1, wherein said one or more fluid-impervious layers are laminated onto the first and/or the second surface of the one or more layers of fluid-pervious sheet material.

5. The filter element of claim 1, wherein said one or more fluid-impervious layers are bonded to the first and/or second surface of the one or more layers of fluid-pervious sheet material under vacuum conditions.

6. The filter element of claim 1, wherein said one or more fluid-impervious layers have been created in situ on the first and/or second surface of the fluid-pervious sheet material.

7. The filter element of claim 1, wherein said one or more fluid-impervious layers are made of a thermoplastic polymer material.

8. The filter element of claim 1, wherein said one or more fluid-impervious layers arranged in between two adjacent layers of fluid-pervious sheet material have a thickness about equal to or larger than the surface roughness of the first and second surfaces of the fluid-pervious sheet material.

9. The filter element of claim 1, wherein said fluid-pervious sheet material is a fibrous depth filter material.

10. The filter element of claim 1, wherein said fluid-pervious sheet material comprises one or more additives.

11. The filter element of claim 1, wherein a first fluid-impervious layer is arranged on the first surface of the layer of fluid-pervious sheet material and a second fluid-impervious layer is arranged on the second surface of the fluid-pervious sheet material.

12. The filter element of claim 1, wherein said one or more fluid-impervious layers are bonded to the layer(s) of fluid-pervious sheet material with a bonding strength equal to or larger than a peeling strength of the fluid-pervious sheet material in a direction perpendicular to the first and second surfaces of the fluid-pervious sheet material.

13. A filter module comprising one or more filter elements according to claim 1, said filter module having a fluid inlet arranged in fluid communication with the fluid intake(s) of the filter element(s) and a fluid outlet in fluid communication with the fluid drainage(s) of the filter element(s).

14. The filter module of claim 13, wherein said filter module further comprises two or more of the filter elements arranged in a stack such that said one or more first edge portions of each layer are provided in fluid communication with each other and said one or more second edge portions are provided in fluid communication with each other.

15. The filter module of claim 13, wherein the module comprises on the top and/or on the bottom of the stack a fluid impervious layer in the form of a first and a second end plate, respectively.

16. The filter module of claim 15, wherein said first and second end plates are designed as fluid distribution and fluid collecting devices and comprise a hollow chamber and have an inner rim around a central opening and an outer rim at the outer periphery, one of said rims comprising a plurality of openings providing a fluid communication to and from the hollow chamber in the interior of the end plate whereas the other rim being closed to seal off said hollow chamber to the environment.

17. The filter module of claim 15, wherein said first and second end plates are designed as fluid distribution and fluid collecting devices and one of them having an inner rim around a central opening and the other one an outer rim at the outer periphery, said rims extending from the end plates in a direction away from the respective surface fluid tightly contacting the stack of filter elements.

18. The filter module of claim 13, wherein the sheet material of the one or more filter elements is provided wound around a winding axis in multiple windings to form a spiral roll with an outer and an inner peripheral surface, said inner peripheral surface defining a central channel of the spiral roll, wherein the sheet material is provided with a first set of through-holes defining the first edge portions and being arranged such that they form one or more first channels extending radially in said spiral roll and wherein the sheet material is further provided with a second set of through-holes defining the second edge portions and being arranged such that they form one or more second channels extending radially and spaced apart from the first channels, said first or said second channels being open at the outer peripheral surface of the spiral roll and closed at the inner peripheral surface of the spiral roll;

and said other of said first and said second channels being closed at the outer peripheral surface of the spiral roll and open at the inner peripheral surface of the spiral roll.

19. The filter module of claim 18, wherein the filter module comprises a first and/or a second end plate attached to the top and bottom front end of the spiral roll, respectively.

20. A filter system comprising a housing and one or more filter modules of claim 13, said housing comprising an inlet opening in fluid communication with the fluid inlet(s) of the filter module(s) and an outlet opening fluidly isolated from the fluid inlet opening and in fluid communication with the fluid outlet(s) of the filter module(s).

21. The filter element of claim 7, wherein said thermoplastic material is selected from polyolefin, polyester and polyamide.

22. The filter element of claim 10, wherein said one or more additives are comprised in the fluid-pervious sheet material in an amount of about 80% by weight of the fluid-pervious sheet material or less.

23. The filter element of claim 12, wherein the one or more fluid-impervious layers bonded to the first and second surfaces of one of the layers of fluid-pervious sheet material are bonded to one another by a plurality of bonding elements extending from one of the fluid-impervious layers through the layer of fluid-pervious sheet material to the other one of the fluid-impervious layers, said bonding elements being essentially regularly distributed over the area of the layer of fluid-pervious sheet material.

24. The filter element of claim 23, wherein the cross-sectional areas of the bonding elements in a plane parallel to the surface of the fluid-pervious sheet material sum up to about 10% or less of the surface area of the layer of fluid-pervious sheet material.

25. The filter module of claim 14, wherein the filter elements in the stack comprise a fluid-impervious layer only on the first surface of the fluid-pervious sheet material and the second surface of the fluid-pervious sheet material is bonded in a fluid tight manner to the fluid-impervious layer of an adjacent filter element.

26. The filter module of claim 15, wherein said first end plate is designed as a fluid distribution device providing a fluid flow path from the fluid inlet of the module to the fluid intake(s) of the filter elements and/or said second end plate is designed as a fluid collecting device providing a fluid flow path from the fluid drainage(s) of the filter elements to the fluid outlet of the module, wherein in case an endplate is provided on the top and on the bottom of the stack, one of the end plates is in the form of a fluid distribution device and the other end plate is in the form of a fluid collecting device.

* * * * *